(12) United States Patent
Yamasaki et al.

(10) Patent No.: US 11,781,044 B2
(45) Date of Patent: Oct. 10, 2023

(54) METHOD FOR PRODUCING COMPOSITE RESIN PARTICLE DISPERSION, METHOD FOR PRODUCING PRESSURE-SENSITIVE ADHESIVE, METHOD FOR PRODUCING PRESSURE-RESPONSIVE RESIN, METHOD FOR PRODUCING TONER FOR ELECTROSTATIC CHARGE IMAGE DEVELOPMENT, AND COMPOSITE RESIN PARTICLES

(71) Applicant: FUJIFILM Business Innovation Corp., Tokyo (JP)

(72) Inventors: Sumiaki Yamasaki, Kanagawa (JP); Takahiro Ishizuka, Kanagawa (JP); Kiyohiro Yamanaka, Kanagawa (JP); Yasunobu Kashima, Kanagawa (JP); Satoshi Inoue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/506,101

(22) Filed: Oct. 20, 2021

(65) Prior Publication Data

US 2022/0306906 A1    Sep. 29, 2022

(30) Foreign Application Priority Data

Mar. 24, 2021  (JP) .................................. 2021-050364

(51) Int. Cl.
 *C09J 7/38* (2018.01)
 *C08F 220/18* (2006.01)
 (Continued)

(52) U.S. Cl.
 CPC .................. *C09J 7/38* (2018.01); *C08F 2/22* (2013.01); *C08F 212/08* (2013.01);
 (Continued)

(58) Field of Classification Search
 CPC .................. C08F 257/02; C08F 212/08; C08F 220/1808; C08F 220/1804; C08F 220/06
 See application file for complete search history.

(56) References Cited

U.S. PATENT DOCUMENTS 4,023,977 A * 5/1977 Mercurio .................. C08L 1/08
                                                         428/464
4,108,946 A * 8/1978 Kamada ................ C08F 285/00
                                                         524/460
(Continued)

FOREIGN PATENT DOCUMENTS

JP    2018-53220 A    4/2018
JP    2021-17465 A    2/2021

OTHER PUBLICATIONS

Foder et al. Macromolecules 2012, 45, 22, 8953-8960 (Year: 2012).*

(Continued)

*Primary Examiner* — Mark S Kaucher
(74) *Attorney, Agent, or Firm* — Sughrue Mion, PLLC

(57) ABSTRACT

A method for producing a composite resin particle dispersion includes: performing polymerization A by polymerizing a styrene compound and a vinyl monomer other than the styrene compound to form a styrene-based resin; performing polymerization B by polymerizing a (meth)acrylic acid ester compound in the presence of the styrene-based resin to form intermediate resin particles containing the styrene-based resin and a (meth)acrylic acid ester-based resin; and performing polymerization C by polymerizing a styrene compound and a vinyl monomer other than the styrene compound in the presence of the intermediate resin particles to form composite resin particles. The mass ratio of the styrene-based resin to the (meth)acrylic acid ester-based resin in the composite resin particles is from 80:20 to 20:80. A (Continued)

difference between the lowest glass transition temperature and the highest glass transition temperature in the composite resin particles is 30° C. or more.

12 Claims, 3 Drawing Sheets

(51) Int. Cl.
  *C08F 2/22* (2006.01)
  *C08F 212/08* (2006.01)
  *G03G 9/08* (2006.01)
  *G03G 9/087* (2006.01)

(52) U.S. Cl.
  CPC .. *C08F 220/1804* (2020.02); *C08F 220/1808* (2020.02); *G03G 9/0823* (2013.01); *G03G 9/08711* (2013.01); *C09J 2301/302* (2020.08); *C09J 2301/312* (2020.08); *C09J 2425/00* (2013.01); *C09J 2433/00* (2013.01)

(56) References Cited

U.S. PATENT DOCUMENTS

| | | | | |
|---|---|---|---|---|
| 5,336,718 | A | * | 8/1994 | Niessner ................ C08L 69/00 525/902 |
| 5,654,365 | A | * | 8/1997 | Havriliak, Jr. .......... C08L 25/06 525/70 |
| 2005/0253276 | A1 | * | 11/2005 | Yamanaka ................ C09J 7/22 257/778 |
| 2014/0363763 | A1 | * | 12/2014 | Shibata .............. G03G 9/08724 430/109.3 |
| 2015/0370185 | A1 | * | 12/2015 | Kurokawa .......... G03G 9/0804 430/137.15 |
| 2019/0292412 | A1 | | 9/2019 | Yamasaki et al. |
| 2021/0017424 | A1 | | 1/2021 | Ishizuka et al. |
| 2021/0221156 | A1 | * | 7/2021 | Courtet ................ C09D 175/04 |

OTHER PUBLICATIONS

Extended European Search Report dated May 20, 2022 in European Application No. 21211586.9.

* cited by examiner

METHOD FOR PRODUCING COMPOSITE RESIN PARTICLE DISPERSION, METHOD FOR PRODUCING PRESSURE-SENSITIVE ADHESIVE, METHOD FOR PRODUCING PRESSURE-RESPONSIVE RESIN, METHOD FOR PRODUCING TONER FOR ELECTROSTATIC CHARGE IMAGE DEVELOPMENT, AND COMPOSITE RESIN PARTICLES

CROSS-REFERENCE TO RELATED APPLICATIONS

This application is based on and claims priority under 35 USC 119 from Japanese Patent Application No. 2021-050364 filed Mar. 24, 2021.

BACKGROUND

(i) Technical Field

The present disclosure relates to a method for producing a composite resin particle dispersion, a method for producing a pressure-sensitive adhesive, a method for producing a pressure-responsive resin, a method for producing a toner for electrostatic charge image development, and composite resin particles.

(ii) Related Art

Japanese Unexamined Patent Application Publication No. 2018-053220 discloses a releasable sheet that allows opposing surfaces thereof to be releasably bonded to each other. The releasable sheet includes a substrate sheet, a pressure-sensitive adhesive layer on at least one surface of the substrate sheet, and a surface layer on a surface of the pressure-sensitive adhesive layer. The pressure-sensitive adhesive layer contains an adhesive base containing a natural rubber-based material. The surface layer contains at least one selected from the group consisting of cellulose nanofibers, chitin nanofibers, and chitosan nanofibers.

Japanese Unexamined Patent Application Publication No. 2021-017465 discloses an adhesive material containing a styrene-based resin containing styrene and a vinyl monomer other than styrene as polymer components and a (meth)acrylic acid ester-based resin containing at least two (meth)acrylic acid esters as polymer components. The mass percentage of the (meth)acrylic acid esters relative to the total mass of the polymer components of the (meth)acrylic acid ester-based resin is 90 mass % or more. The mass ratio of the styrene-based resin to the (meth)acrylic acid ester-based resin is from 80:20 to 20:80. The adhesive material contains resin particles having at least two glass transition temperatures. The lowest glass transition temperature is −30° C. or lower, and the highest glass transition temperature is 30° C. or higher.

SUMMARY

Aspects of non-limiting embodiments of the present disclosure relate to a method for producing a composite resin particle dispersion that shows better tackiness in pressure bonding and higher storage stability and prevents sheet tearing after storage compared with a method including only a polymerization step A of polymerizing a styrene compound and a vinyl monomer other than the styrene compound to form a styrene-based resin, and a polymerization step B of polymerizing a (meth)acrylic acid ester compound in the presence of the styrene-based resin to form intermediate resin particles containing the styrene-based resin and a (meth)acrylic acid ester-based resin.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a composite resin particle dispersion including: performing polymerization A by polymerizing a styrene compound and a vinyl monomer other than the styrene compound to form a styrene-based resin; performing polymerization B by polymerizing a (meth)acrylic acid ester compound in the presence of the styrene-based resin to form intermediate resin particles containing the styrene-based resin and a (meth)acrylic acid ester-based resin; and performing polymerization C by polymerizing a styrene compound and a vinyl monomer other than the styrene compound in the presence of the intermediate resin particles to form composite resin particles, wherein a mass ratio of the styrene-based resin to the (meth)acrylic acid ester-based resin in the composite resin particles is from 80:20 to 20:80, and a difference between the lowest glass transition temperature and the highest glass transition temperature in the composite resin particles is 30° C. or more.

BRIEF DESCRIPTION OF THE DRAWINGS

Exemplary embodiments of the present disclosure will be described in detail based on the following figures, wherein.

DETAILED DESCRIPTION

Figure 1:
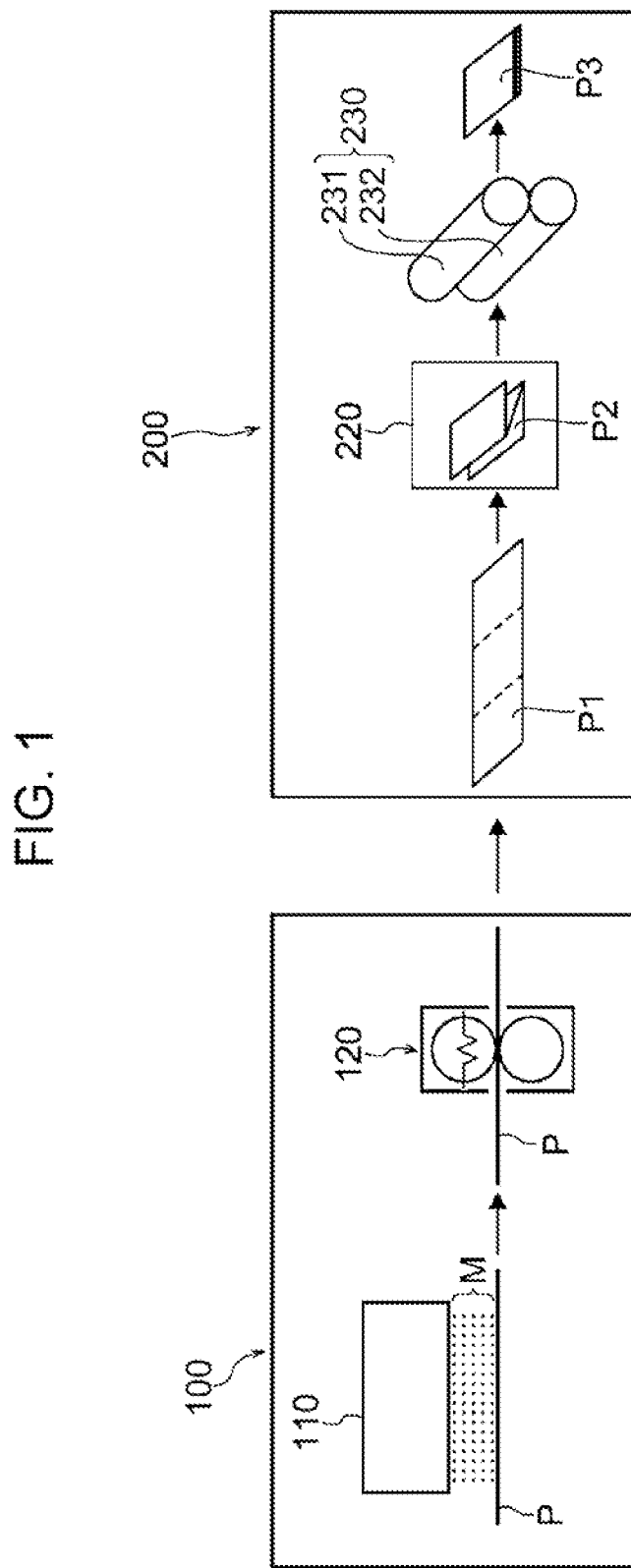
FIG. 1 is a schematic view of one example of a printed material producing apparatus according to an exemplary embodiment.

Exemplary embodiments will be described below. The following description and Examples are for illustrating the exemplary embodiments, but are not intended to limit the scope of the exemplary embodiments.

The numerical ranges expressed by using "to" in exemplary embodiments indicate ranges including the numerical values before and after "to" as the minimum value and the maximum value.

The upper limit or lower limit of one numerical range in stepwise numerical ranges in exemplary embodiments may be replaced by the upper limit or lower limit of another stepwise numerical range. The upper limit or lower limit of any numerical range described in exemplary embodiments may be replaced by the values described in Examples.

In exemplary embodiments, the term "step" includes not only an independent step but also a step that cannot be clearly distinguished from other steps but accomplishes the intended purpose.

In the description of exemplary embodiments with reference to the drawings in the exemplary embodiments, the structures of the exemplary embodiments are not limited to the structures shown in the drawings. The sizes of members in each figure are schematic, and the relative relationship between the sizes of the members is not limited to what is illustrated.

In exemplary embodiments, each component may include two or more corresponding substances. In exemplary embodiments, the amount of each component in a composition refers to, when there are two or more substances corresponding to each component in the composition, the total amount of the substances present in the composition, unless otherwise specified.

In exemplary embodiments, each component may include two or more types of particles corresponding to each component. The particle size of each component refers to, when there are two or more types of particles corresponding to each component in the composition, the particle size of a mixture of two or more types of particles present in the composition, unless otherwise specified.

In exemplary embodiments, the term "(meth)acrylic" refers to both "acrylic" and "methacrylic."

In exemplary embodiments, the "toner for electrostatic charge image development" is also referred to simply as "toner", and the "electrostatic charge image developer" is also referred to simply as a "developer."

In exemplary embodiments, a printed material formed by folding a recording medium and bonding the opposing surfaces of the folded recording medium to each other or a printed material formed by stacking two or more recording media on top of each other and bonding the opposing surfaces of the stacked recording media to each other is referred to as a "pressure-bonded printed material".

Method for Producing Composite Resin Particle Dispersion

A method for producing a composite resin particle dispersion according to an exemplary embodiment includes: a polymerization step A of polymerizing a styrene compound and a vinyl monomer other than the styrene compound to form a styrene-based resin; a polymerization step B of polymerizing a (meth)acrylic acid ester compound in the presence of the styrene-based resin to form intermediate resin particles containing the styrene-based resin and a (meth)acrylic acid ester-based resin; and a polymerization step C of polymerizing a styrene compound and a vinyl monomer other than the styrene compound in the presence of the intermediate resin particles to form composite resin particles. The mass ratio of the styrene-based resin to the (meth)acrylic acid ester-based resin in the composite resin particles is from 80:20 to 20:80. A difference between the lowest glass transition temperature and the highest glass transition temperature in the composite resin particles is 30° C. or more.

When the composite resin particles are produced by a method for producing a composite resin particle dispersion involving emulsion polymerization for producing a styrene-based resin containing styrene and a vinyl monomer other than styrene as polymer components and subsequent polymerization through dropwise addition of at least (meth)acrylic acid ester, wherein a difference between the lowest glass transition temperature and the highest glass transition temperature is 30° C. or more, the lower Tg component, (meth)acrylic acid ester-based resin, is slightly exposed on the surfaces of the composite resin particles. The composite resin particles may aggregate when the composite resin particles are applied to a sheet and dried, so that the tackiness may become locally high, and the sheet may tear from that area. This phenomenon is particularly notable in a summer environment.

The method for producing a composite resin particle dispersion according to the exemplary embodiment includes: a polymerization step B of polymerizing a (meth)acrylic acid ester compound in the presence of the styrene-based resin to form intermediate resin particles containing the styrene-based resin and a (meth)acrylic acid ester-based resin; and a polymerization step C of polymerizing a styrene compound and a vinyl monomer other than the styrene compound in the presence of the intermediate resin particles to form composite resin particles. The method including these steps may eliminate slight exposure of the lower Tg component on the surfaces and may provide better tackiness and better storage stability of the dispersion to prevent sheet tearing after storage.

The method for producing a composite resin particle dispersion according to the exemplary embodiment will be described below in detail. In the following description, unless otherwise specified, the term "styrene-based resin" refers to a "styrene-based resin containing 50 mass % or more of a styrene compound as a polymer component", and the term "(meth)acrylic acid ester-based resin" refers to a "(meth)acrylic acid ester-based resin containing 50 mass % or more of a (meth)acrylic acid ester compound as a polymer component".

A (meth)acrylic compound is any compound having a (meth)acrylic group. Examples of the (meth)acrylic compound include a (meth)acrylate compound, a (meth)acrylamide compound, (meth)acrylic acid, and (meth)acrylonitrile.

In the method for producing a composite resin particle dispersion according to the exemplary embodiment, the mass ratio of the styrene-based resin to the (meth)acrylic acid ester-based resin in the composite resin particles is from 80:20 to 20:80, preferably from 70:30 to 30:70, more preferably from 60:40 to 40:60 from the viewpoint of the tackiness in pressure bonding and the storage stability of the dispersion and to prevent sheet tearing after storage.

The styrene-based resin contained in the composite resin particles contains both the styrene-based resin synthesized in the polymerization step A and the styrene-based resin synthesized in the polymerization step C.

In the method for producing a composite resin particle dispersion according to the exemplary embodiment, a difference between the lowest glass transition temperature and the highest glass transition temperature in the composite resin particles is 30° C. or more, preferably 40° C. or more, more preferably 60° C. or more, still more preferably 60° C. or more and 200° C. or less, yet still more preferably 80° C. or more and 150° C. or less from the viewpoint of the tackiness in pressure bonding and the storage stability of the dispersion and to prevent sheet tearing after storage.

The lowest glass transition temperature in the composite resin particles may be the glass transition temperature of the (meth)acrylic acid ester-based resin.

The highest glass transition temperature in the composite resin particles may be the glass transition temperature of the styrene-based resin. In some exemplary embodiments, the lowest glass transition temperature in the composite resin particles is the glass transition temperature of the (meth)acrylic acid ester-based resin, and the highest glass transition temperature in the composite resin particles is the glass transition temperature of the styrene-based resin.

In the present disclosure, the glass transition temperatures of the resins are determined from differential scanning calorimetry curves (DSC curves) obtained by differential scanning calorimetry (DSC). More specifically, the glass transition temperature is determined from "extrapolated glass transition onset temperature" described in the method for determining a glass transition temperature in "Testing Methods for Transition Temperatures of Plastics" in JIS K7121:1987.

The composite resin particles produced by the method for producing a composite resin particle dispersion according to the exemplary embodiment may have a styrene-based resin and a (meth)acrylic acid ester-based resin inside and a styrene-based resin on the surfaces thereof.

The composite resin particles preferably have 90 mass % or more of the (meth)acrylic acid ester-based resin inside, more preferably have 95 mass % or more of the (meth) acrylic acid ester-based resin inside, still more preferably have 99 mass % or more of the (meth)acrylic acid ester-based resin inside from the viewpoint of the tackiness in pressure bonding and the storage stability of the dispersion and to prevent sheet tearing after storage.

Polymerization Step A

The method for producing a composite resin particle dispersion according to the exemplary embodiment includes a polymerization step A of polymerizing a styrene compound and a vinyl monomer other than the styrene compound to form a styrene-based resin.

The polymerization in the polymerization step A is not limited and may be emulsion polymerization.

The method for producing a composite resin particle dispersion according to the exemplary embodiment may involve emulsion polymerization.

The polymerization step A is preferably a step of forming styrene-based resin particles, more preferably a step of forming a styrene-based resin particle dispersion.

One method for dispersing styrene-based resin particles in a dispersion medium involves, for example, stirring a mixture of a styrene-based resin and a dispersion medium with a rotary shear homogenizer, a ball mill having media, a sand mill, or Dyno-Mill to form a dispersion.

Another method for dispersing styrene-based resin particles in a dispersion medium is emulsion polymerization. Specifically, emulsion polymerization involves mixing polymer components of the styrene-based resin with a chain transfer agent or a polymerization initiator, then further mixing the mixture with an aqueous medium containing a surfactant under stirring to form an emulsion, and polymerizing a styrene-based resin in the emulsion. In this case, the chain transfer agent is preferably a thiol compound, more preferably dodecane thiol.

Examples of the dispersion medium include aqueous media, such as water and alcohols. These aqueous media may be used alone or in combination of two or more.

Examples of the surfactant include anionic surfactants, such as sulfate ester salts, sulfonate salts, phosphate esters, and soaps; cationic surfactants, such as amine salts and quaternary ammonium salts; and nonionic surfactants, such as polyethylene glycols, alkylphenol ethylene oxide adducts, and polyhydric alcohols. A nonionic surfactant may be used in combination with an anionic surfactant or a cationic surfactant. Of these surfactants, an anionic surfactant may be used. The surfactant may be used alone or in combination of two or more.

Examples of the polymerization initiator include, but are not limited to, known photopolymerization initiators and known thermal polymerization initiators.

Of these, thermal polymerization initiators are preferred, peroxides are more preferred, and ammonium persulfate is still more preferred.

The polymerization temperature and the polymerization time are not limited and appropriately selected to according to, for example, the monomers and the polymerization initiator used.

The styrene compound in the polymerization step A may include styrene.

The mass percentage of styrene relative to the total mass of the polymer components of the styrene-based resin synthesized in the polymerization step A is preferably 60 mass % or more, more preferably 70 mass % or more, still more preferably 75 mass % or more in order to prevent fluidization of the composite resin particles under no pressure, and preferably 95 mass % or less, more preferably 90 mass % or less, still more preferably 85 mass % or less in order to form composite resin particles that easily undergo pressure-induced phase transition.

Examples of styrene compounds other than styrene used in the polymerization step A include vinyl naphthalene; alkyl-substituted styrenes, such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes, such as p-phenylstyrene; alkoxy-substituted styrenes, such as p-methoxystyrene; halogen-substituted styrenes, such as p-chlorostyrene, 3,4-dichlorostyrene, p-fluorostyrene, and 2,5-difluorostyrene; and nitro-substituted styrenes, such as m-nitrostyrene, o-nitrostyrene, and p-nitrostyrene. The styrene compound may be used alone or in combination of two or more.

Examples of the vinyl monomer other than the styrene compound in the styrene-based resin used in the polymerization step A include an acrylic monomer.

The acrylic monomer used in the polymerization step A may be at least one acrylic monomer selected from the group consisting of (meth)acrylic acid and (meth)acrylic acid ester compounds. Examples of (meth)acrylic acid ester compounds include (meth)acrylic acid alkyl ester compounds, (meth)acrylic acid carboxy-substituted alkyl ester compounds, (meth)acrylic acid hydroxy-substituted alkyl ester compounds, (meth)acrylic acid alkoxy-substituted alkyl ester compounds, and di(meth)acrylic acid ester compounds. The acrylic monomer may be used alone or in combination of two or more.

Examples of (meth)acrylic acid alkyl ester compounds include methyl (meth)acrylate, ethyl (meth)acrylate, propyl (meth)acrylate, isopropyl (meth)acrylate, n-butyl (meth) acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of (meth)acrylic acid carboxy-substituted alkyl esters include 2-carboxyethyl (meth)acrylate.

Examples of (meth)acrylic acid hydroxy-substituted alkyl ester compounds include 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate, and 4-hydroxybutyl (meth)acrylate.

Examples of (meth)acrylic acid alkoxy-substituted alkyl ester compounds include 2-methoxyethyl (meth)acrylate.

Examples of di(meth)acrylic acid ester compounds include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylic acid ester compounds include 2-(diethylamino)ethyl (meth)acrylate, benzyl (meth)acrylate, and methoxy polyethylene glycol (meth)acrylate.

Examples of the vinyl monomer other than the styrene compound in the styrene-based resin used in the polymerization step A include (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene.

To form composite resin particles that easily undergo pressure-induced phase transition, the styrene-based resin synthesized in the polymerization step A preferably contains a (meth)acrylic acid ester compound as a polymer component, more preferably contains a (meth)acrylic acid alkyl ester compound as a polymer component, still more preferably contains a (meth)acrylic acid alkyl ester compound with a C2-C10 alkyl group, yet still more preferably contains a (meth)acrylic acid alkyl ester compound with a C4-C8 alkyl group, yet still more preferably contains at least one of n-butyl acrylate and 2-ethylhexyl acrylate.

To form composite resin particles that easily undergo pressure-induced phase transition, the vinyl monomer present at the highest mass percentage in the styrene-based resin among vinyl monomers other than styrene in the polymerization step A is preferably a (meth)acrylic acid ester, more preferably a (meth)acrylic acid alkyl ester compound, still more preferably a (meth)acrylic acid alkyl ester compound with a C2-C10 alkyl group, yet still more preferably n-butyl acrylate or 2-ethylhexyl acrylate.

The mass percentage of the (meth)acrylic acid ester compound relative to the total mass of the polymer components of the styrene-based resin synthesized in the polymerization step A is preferably 40 mass % or less, more preferably 30 mass % or less, still more preferably 25 mass % or less in order to prevent fluidization of the composite resin particles under no pressure, and preferably 5 mass % or more, more preferably 10 mass % or more, still more preferably 15 mass % or more in order to facilitate the pressure-induced phase transition of the composite resin particles. The (meth)acrylic acid ester compound is preferably a (meth)acrylic acid alkyl ester compound, more preferably a (meth)acrylic acid alkyl ester compound with a C2-C10 alkyl group, still more preferably a (meth)acrylic acid alkyl ester compound with a C4-C8 alkyl group.

The styrene-based resin synthesized in the polymerization step A may contain at least one of n-butyl acrylate and 2-ethylhexyl acrylate as a polymer component. The total amount of n-butyl acrylate and 2-ethylhexyl acrylate relative to the total amount of the polymer components of the styrene-based resin is preferably 40 mass % or less, more preferably 30 mass % or less, still more preferably 25 mass % or less in order to prevent fluidization of the composite resin particles under no pressure, and preferably 5 mass % or more, more preferably 10 mass % or more, still more preferably 15 mass % or more in order to form composite resin particles that easily undergo pressure-induced phase transition.

The weight average molecular weight of the styrene-based resin synthesized in the polymerization step A is preferably 10,000 or more, more preferably 20,000 or more, still more preferably 30,000 or more in order to prevent fluidization of the composite resin particles under no pressure, and preferably 200,000 or less, more preferably 150,000 or less, still more preferably 100,000 or less in order to form composite resin particles that easily undergo pressure-induced phase transition.

In the present disclosure, the weight average molecular weights of the resins are determined by gel permeation chromatography (GPC). The measurement of the molecular weights by GPC is carried out by using HLC-8120GPC available from Tosoh Corporation as a GPC system, TSKgel SuperHM-M (15 cm) available from Tosoh Corporation as a column, and tetrahydrofuran as a solvent. The weight average molecular weights of the resins are calculated from molecular weight calibration curves made by using a monodisperse polystyrene standard.

The glass transition temperature of the styrene-based resin synthesized in the polymerization step A is preferably 30° C. or higher, more preferably 40° C. or higher, still more preferably 50° C. or higher in order to prevent fluidization of the composite resin particles under no pressure, and preferably 110° C. or lower, more preferably 100° C. or lower, still more preferably 90° C. or lower in order to form composite resin particles that easily undergo pressure-induced phase transition.

In the polymerization step A, the volume average particle size of the styrene-based resin particles to be dispersed in the styrene-based resin particle dispersion is preferably 100 nm or more and 250 nm or less, more preferably 120 nm or more and 220 nm or less, still more preferably 150 nm or more and 200 nm or less.

The volume average particle size (D50v) of the resin particles contained in the resin particle dispersion refers to the particle size at 50% cumulative volume from the smallest particle size in the volume-based particle size distribution obtained by measuring particle sizes with a laser diffraction particle size distribution analyzer (e.g., LA-700 available from Horiba Ltd).

Polymerization Step B

The method for producing a composite resin particle dispersion according to the exemplary embodiment includes a polymerization step B of polymerizing a (meth)acrylic acid ester compound in the presence of the styrene-based resin synthesized in the polymerization step A to form intermediate resin particles containing the styrene-based resin and a (meth)acrylic acid ester-based resin The polymerization step B may be a step of forming intermediate resin particle dispersion.

One method for dispersing the intermediate resin particles in a dispersion medium involves, for example, stirring a mixture of a styrene-based resin and a dispersion medium with a rotary shear homogenizer, a ball mill having media, a sand mill, or Dyno-Mill to form a dispersion.

Another method for dispersing the intermediate resin particles in a dispersion medium involves adding polymer components of the (meth)acrylic acid ester-based resin to a styrene-based resin particle dispersion and adding an aqueous medium as desired. Next, while the dispersion is gently stirred, the temperature of the dispersion is raised to the glass transition temperature of the produced styrene-based resin or higher (e.g., a temperature higher than the glass transition temperature of the styrene-based resin by 10° C. to 30° C.). Next, while the temperature is maintained, an aqueous medium containing a polymerization initiator is slowly added dropwise, and stirring is further continued for a long time in the range of 1 hour or more and 15 hours or less. In this case, ammonium persulfate may be used as a polymerization initiator.

Examples of the dispersion medium and the polymerization initiator may include those described above.

The step of forming composite resin particles may use a surfactant. Examples of the surfactant may include those described above.

The polymerization temperature and the polymerization time are not limited and appropriately selected to according to, for example, the monomers and the polymerization initiator used.

The (meth)acrylic acid ester compound used in the polymerization step B may be used alone or in combination of two or more. At least two (meth)acrylic acid esters may be contained as polymer components.

The mass percentage of the (meth)acrylic acid ester relative to the total mass of the polymer components of the (meth)acrylic acid ester-based resin synthesized in the polymerization step B is 90 mass % or more, more preferably 95 mass % or more, still more preferably 98 mass % or more, yet still more preferably 100 mass %.

Examples of (meth)acrylic acid ester compounds used in the polymerization step B include (meth)acrylic acid alkyl ester compounds, (meth)acrylic acid carboxy-substituted alkyl ester compounds, (meth)acrylic acid hydroxy-substituted alkyl ester compounds, (meth)acrylic acid alkoxy-substituted alkyl ester compounds, and di(meth)acrylic acid ester compounds.

Examples of (meth)acrylic acid alkyl ester compounds include methyl (meth)acrylate, ethyl (meth)acrylate, propyl (meth)acrylate, isopropyl (meth)acrylate, n-butyl (meth) acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, and isobornyl (meth)acrylate.

Examples of (meth)acrylic acid carboxy-substituted alkyl ester compounds include 2-carboxyethyl (meth)acrylate.

Examples of (meth)acrylic acid hydroxy-substituted alkyl ester compounds include 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate, and 4-hydroxybutyl (meth)acrylate.

Examples of (meth)acrylic acid alkoxy-substituted alkyl ester compounds include 2-methoxyethyl (meth)acrylate.

Examples of di(meth)acrylic acid ester compounds include ethylene glycol di(meth)acrylate, diethylene glycol di(meth)acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of (meth)acrylic acid ester compounds include 2-(diethylamino)ethyl (meth)acrylate, benzyl (meth)acrylate, and methoxy polyethylene glycol (meth)acrylate.

The (meth)acrylic acid ester compound used in the polymerization step B is preferably a (meth)acrylic acid alkyl ester compound, more preferably a (meth)acrylic acid alkyl ester compound with a C2-C10 alkyl group, still more preferably a (meth)acrylic acid alkyl ester compound with a C4-C8 alkyl group, yet still more preferably n-butyl acrylate or 2-ethylhexyl acrylate in order to form composite resin particles that easily undergo pressure-induced phase transition and have good adhesiveness.

The styrene-based resin synthesized in the polymerization step A and the (meth)acrylic acid ester-based resin synthesized in the polymerization step B may contain the same (meth)acrylic acid ester compound as a polymer component in order to form composite resin particles that easily undergo pressure-induced phase transition. In other words, the styrene-based resin synthesized in the polymerization step A and the (meth)acrylic acid ester-based resin synthesized in the polymerization step B may each have a structural unit derived from the same (meth)acrylic acid ester compound in order to form composite resin particles that easily undergo pressure-induced phase transition.

Two (meth)acrylic acid ester compounds present at the highest two mass percentages among at least two (meth) acrylic acid ester compounds contained as polymer components in the (meth)acrylic acid ester-based resin synthesized in the polymerization step B may be (meth)acrylic acid alkyl ester compounds. The (meth)acrylic acid alkyl ester compounds are preferably (meth)acrylic acid alkyl ester compounds with a C2-C10 alkyl group, more preferably (meth) acrylic acid alkyl ester compounds with a C4-C8 alkyl group.

When two (meth)acrylic acid ester compounds present at the highest two mass percentages among at least two (meth) acrylic acid ester compounds contained as polymer components in the (meth)acrylic acid ester-based resin synthesized in the polymerization step B are (meth)acrylic acid alkyl ester compounds, a difference in number of carbon atoms between the alkyl groups of the two (meth)acrylic acid alkyl ester compounds is preferably 1 or more and 4 or less, more preferably 2 or more and 4 or less, still more preferably 3 or 4 in order to form composite resin particles that easily undergo pressure-induced phase transition and have better tackiness.

To form composite resin particles that easily undergo pressure-induced phase transition and have better tackiness, the (meth)acrylic acid ester-based resin synthesized in the polymerization step B preferably contains n-butyl acrylate and 2-ethylhexyl acrylate as polymer components, and more preferably two (meth)acrylic acid ester compounds present at the highest two mass percentages among at least two (meth)acrylic acid ester compounds contained as polymer components in the (meth)acrylic acid ester-based resin may be n-butyl acrylate and 2-ethylhexyl acrylate. The total amount of n-butyl acrylate and 2-ethylhexyl acrylate relative to the total amount of the polymer components of the (meth)acrylic acid ester-based resin is preferably 90 mass % or more, more preferably 95 mass % or more, still more preferably 98 mass % or more, yet still more preferably 100 mass %.

The (meth)acrylic acid ester-based resin synthesized in the polymerization step B may contain, as a polymer component, a vinyl monomer other than (meth)acrylic acid ester compounds. Examples of the vinyl monomer other than (meth)acrylic acid esters include (meth)acrylic acid; styrene; styrene-based monomers other than styrene; (meth)acrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as isoprene, butene, and butadiene. These vinyl monomers may be used alone or in combination of two or more.

When the (meth)acrylic acid ester-based resin synthesized in the polymerization step B contains, as a polymer component, a vinyl monomer other than (meth)acrylic acid ester compounds, the vinyl monomer other than (meth)acrylic acid ester compounds is preferably at least one of acrylic acid and methacrylic acid, more preferably acrylic acid.

The weight average molecular weight of the (meth)acrylic acid ester-based resin synthesized in the polymerization step A is preferably 10,000 or more, more preferably 20,000 or more, still more preferably 30,000 or more in order to prevent fluidization of the composite resin particles under no pressure, and preferably 200,000 or less, more preferably 150,000 or less, still more preferably 100,000 or less in order to form composite resin particles that easily undergo pressure-induced phase transition.

The glass transition temperature of the (meth)acrylic acid ester-based resin synthesized in the polymerization step B is preferably 10° C. or lower, more preferably 0° C. or lower, still more preferably −10° C. or lower in order to form composite resin particles that easily undergo pressure-induced phase transition, and preferably −90° C. or higher, more preferably −80° C. or higher, still more preferably −70° C. or higher in order to prevent fluidization of the composite resin particles under no pressure.

The volume average particle size of the intermediate resin particles to be dispersed in the intermediate resin particle dispersion is preferably 140 nm or more and 300 nm or less, more preferably 150 nm or more and 280 nm or less, still more preferably 160 nm or more and 250 nm or less.

Polymerization Step C

The method for producing a composite resin particle dispersion according to the exemplary embodiment includes a polymerization step C of polymerizing a styrene compound and a vinyl monomer other than the styrene compound in the presence of the intermediate resin particles produced in the polymerization step B to form composite resin particles.

The polymerization step C may be a step of forming a composite resin particle dispersion.

One method for dispersing the composite resin particles in a dispersion medium involves, for example, mixing the prepared composite resin particles and a dispersion medium and stirring the mixture using a rotary shear homogenizer, a ball mill having media, a sand mill, or Dyno-Mill to form a dispersion.

Another method for dispersing composite resin particles in a dispersion medium involves adding polymer components (a group of monomers including at least styrene and a vinyl monomer other than styrene) of the styrene-based resin to an intermediate resin particle dispersion and adding an aqueous medium as desired. Next, while the dispersion is gently stirred, the temperature of the dispersion is raised to the glass transition temperature of the produced styrene-based resin or higher (e.g., a temperature higher than the glass transition temperature of the styrene-based resin by 10° C. to 30° C.). Next, while the temperature is maintained, an aqueous medium containing a polymerization initiator is slowly added dropwise, and stirring is further continued for a long time in the range of 1 hour or more and 15 hours or less. In this case, ammonium persulfate may be used as a polymerization initiator.

Examples of the dispersion medium and the polymerization initiator may include those described above.

The step of forming composite resin particles may use a surfactant. Examples of the surfactant may include those described above.

The polymerization temperature and the polymerization time are not limited and appropriately selected to according to, for example, the monomers and the polymerization initiator used.

A difference between the polymerization temperature in the polymerization step B and the polymerization temperature in the polymerization step C is not limited, but preferably 10° C. or less, more preferably 5° C. or less, still more preferably 2° C. or less from the viewpoint of the tackiness in pressure bonding and the storage stability of the dispersion and to prevent sheet tearing after storage.

Exemplary aspects of the styrene compound and the vinyl monomer other than the styrene compound used in the polymerization step C are the same as exemplary aspects of the styrene compound and the vinyl monomer other than the styrene compound used in the polymerization step A except for the following features.

The vinyl monomer other than the styrene compound used in the polymerization step C preferably includes one or two (meth)acrylic acid ester compounds, more preferably includes only one (meth)acrylic acid ester compound from the viewpoint of the tackiness in pressure bonding and the storage stability of the dispersion and to prevent sheet tearing after storage.

The styrene-based resin synthesized in the polymerization step C and the (meth)acrylic acid ester-based resin synthesized in the polymerization step B may contain the same (meth)acrylic acid ester compound as a polymer component in order to form composite resin particles that easily undergo pressure-induced phase transition. In other words, the styrene-based resin synthesized in the polymerization step C and the (meth)acrylic acid ester-based resin synthesized in the polymerization step B may each have a structural unit derived from the same (meth)acrylic acid ester compound in order to form composite resin particles that easily undergo pressure-induced phase transition.

In addition, the styrene-based resin synthesized in the polymerization step A, the (meth)acrylic acid ester-based resin synthesized in the polymerization step B, and the styrene-based resin synthesized in the polymerization step C may contain the same (meth)acrylic acid ester compound as a polymer component in order to form composite resin particles that easily undergo pressure-induced phase transition. In other words, the styrene-based resin synthesized in the polymerization step A, the (meth)acrylic acid ester-based resin synthesized in the polymerization step B, and the styrene-based resin synthesized in the polymerization step C may have a structural unit derived from the same (meth)acrylic acid ester compound in order to form composite resin particles that easily undergo pressure-induced phase transition.

The mass ratio of the total amount of the styrene compound and the vinyl monomer other than the styrene compound added in the polymerization step C to the amount of the (meth)acrylic acid ester-based resin contained in the intermediate resin particles is preferably from 5:95 to 40:60, more preferably from 10:90 to 30:70 from the viewpoint of the tackiness in pressure bonding and the storage stability of the dispersion and to prevent sheet tearing after storage.

The styrene-based resin synthesized in the polymerization step A and the styrene-based resin synthesized in the polymerization step C may have the same composition, but preferably have different compositions from the viewpoint of the tackiness in pressure bonding and the storage stability of the dispersion and to prevent sheet tearing after storage.

A difference in glass transition temperature between the styrene-based resin synthesized in the polymerization step A and the styrene-based resin synthesized in the polymerization step C is not limited, but preferably 10° C. or less, more preferably 5° C. or less, still more preferably 2° C. or less from the viewpoint of the tackiness in pressure bonding and the storage stability of the dispersion and to prevent sheet tearing after storage.

The weight average molecular weight of the resins in the composite resin particles is preferably 100,000 or more, more preferably 120,000 or more, still more preferably 150,000 or more in order to prevent fluidization of the composite resin particles under no pressure, and preferably 400,000 or less, more preferably 300,000 or less, still more preferably 250,000 or less in order to form composite resin particles that easily undergo pressure-induced phase transition.

The total amount of the styrene-based resin and the (meth)acrylic acid ester-based resin contained in the composite resin particles in the exemplary embodiment is preferably 70 mass % or more, more preferably 80 mass % or more, still more preferably 90 mass % or more, yet still more preferably 95 mass % or more, yet still more preferably 100 mass % relative to the entire composite resin particles.

Other Resins

Examples of the composite resin particles include polystyrene; and non-vinyl resins, such as epoxy resins, polyester resins, polyurethane resins, polyamide resins, cellulose resins, polyether resins, and modified rosins. These resins may be used alone or in combination of two or more.

Various Additives

The composite resin particles may contain, as desired, colorants (e.g., pigments, dyes), release agents (e.g., hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters, and charge control agents.

When the composite resin particles are transparent resin particles, the amount of colorant in the composite resin particles relative to the entire composite resin particles is preferably 1.0 mass % or less, more preferably as low as possible in order to improve the transparency of the composite resin particles.

The volume average particle size of the composite resin particles to be dispersed in the composite resin particle dispersion is preferably 140 nm or more and 300 nm or less, more preferably 150 nm or more and 280 nm or less, still more preferably 160 nm or more and 250 nm or less.

The amount of the composite resin particles in the composite resin particle dispersion is not limited but preferably 10 mass % or more and 80 mass % or less, more preferably 20 mass % or more and 70 mass % or less, still more preferably 30 mass % or more and 60 mass % or less relative to the entire composite resin particle dispersion.

The composite resin particles produced by the method for producing a composite resin particle dispersion according to the exemplary embodiment are preferably pressure-responsive particles that undergo pressure-induced phase transition and more preferably satisfy Formula 1 below.

$$10° C. \leq T1-T2 \quad \text{Formula 1}$$

In Formula 1, T1 is a temperature corresponding to a viscosity of 10,000 Pa·s at a pressure of 1 MPa, and T2 is a temperature corresponding to a viscosity of 10,000 Pa·s at a pressure of 10 MPa.

The temperature difference (T1−T2) is 10° C. or more, preferably 15° C. or more, more preferably 20° C. or more in order to facilitate the pressure-induced phase transition of the pressure-responsive particles, and preferably 120° C. or less, more preferably 100° C. or less, still more preferably 80° C. or less in order to prevent fluidization of the pressure-responsive particles under no pressure.

The temperature T1 is preferably 140° C. or lower, more preferably 130° C. or lower, still more preferably 120° C. or lower, yet still more preferably 115° C. or lower. The lower limit of the temperature T1 is preferably 80° C. or higher, more preferably 85° C. or higher.

The temperature T2 is preferably 40° C. or higher, more preferably 50° C. or higher, still more preferably 60° C. or higher. The upper limit of the temperature T2 is preferably 85° C. or lower.

Examples of the indicator for the susceptibility of the pressure-responsive particles to pressure-induced phase transition include a temperature difference (T1−T3) between the temperature T1 corresponding to a viscosity of 10,000 Pas at a pressure of 1 MPa and the temperature T3 corresponding to a viscosity of 10,000 Pas at a pressure of 4 MPa. The temperature difference (T1−T3) may be 5° C. or more. To facilitate the pressure-induced phase transition of the pressure-responsive particles according to the exemplary embodiment, the temperature difference (T1−T3) is preferably 5° C. or more, more preferably 10° C. or more.

The temperature difference (T1−T3) is typically 25° C. or less.

To obtain a temperature difference (T1−T3) of 5° C. or more, the temperature T3 corresponding to a viscosity of 10,000 Pas at a pressure of 4 MPa for the pressure-responsive particles is preferably 90° C. or lower, more preferably 85° C. or lower, still more preferably 80° C. or lower. The lower limit of the temperature T3 is preferably 60° C. or higher.

The method for determining the temperature T1, the temperature T2, and the temperature T3 is as described below.

A pellet sample is prepared by compressing the pressure-responsive particles. The pellet sample is set in a flow tester (CFT-500 available from Shimadzu Corporation). The applied pressure is fixed at 1 MPa, and the viscosity against temperature at 1 MPa is measured. From the obtained viscosity graph, the temperature T1 corresponding to a viscosity of $10^4$ Pa·s at an applied pressure of 1 MPa is determined. The temperature T2 is determined in the same manner as that in the method for determining the temperature T1 except that the applied pressure is changed from 1 MPa to 10 MPa. The temperature T3 is determined in the same manner as that in the method for determining the temperature T1 except that the applied pressure is changed from 1 MPa to 4 MPa. The temperature difference (T1−T2) is calculated from the temperature T1 and the temperature T2. The temperature difference (T1−T3) is calculated from the temperature T1 and the temperature T3.

Usage of Composite Resin Particles

The composite resin particles and the composite resin particle dispersion produced by the method for producing a composite resin particle dispersion according to the exemplary embodiment are used in any application and may be used in a pressure-sensitive adhesive or a pressure-responsive resin, or as a binder resin for toner for electrostatic charge image development.

The composite resin particles according to the exemplary embodiment are produced by the method for producing a composite resin particle dispersion according to the exemplary embodiment.

For example, a method for producing a pressure-sensitive adhesive according to an exemplary embodiment may include the method for producing a composite resin particle dispersion according to the exemplary embodiment.

The pressure-sensitive adhesive according to the exemplary embodiment contains the composite resin particles produced by the method for producing a composite resin particle dispersion according to the exemplary embodiment.

A method for producing a pressure-responsive resin according to an exemplary embodiment includes the method for producing a composite resin particle dispersion according to the exemplary embodiment.

The pressure-responsive resin according to the exemplary embodiment contains the composite resin particles produced by the method for producing a composite resin particle dispersion according to the exemplary embodiment or a resin formed by aggregation and coalescence of the composite resin particles.

The method for producing a toner for electrostatic charge image development according to the exemplary embodiment uses the composite resin particle dispersion produced by the method for producing a composite resin particle dispersion according to the exemplary embodiment.

The toner for electrostatic charge image development according to the exemplary embodiment contains a resin formed by aggregation and coalescence of the composite resin particles produced by the method for producing a composite resin particle dispersion according to the exemplary embodiment.

Pressure-Sensitive Adhesive

The pressure-sensitive adhesive according to the exemplary embodiment contains the composite resin particles produced by the method for producing a composite resin particle dispersion according to the exemplary embodiment.

When the pressure-sensitive adhesive according to the exemplary embodiment is a liquid composition, the pressure-sensitive adhesive according to the exemplary embodiment may contain a dispersion medium.

Examples of the dispersion medium include aqueous media, such as water and alcohols such as propylene glycol, 1,3-propanediol, and diethylene glycol. These aqueous media may be used alone or in combination of two or more.

When the pressure-sensitive adhesive according to the exemplary embodiment is a liquid composition, the amount of the composite resin particles is preferably, but not necessarily, 10 mass % or more and 80 mass % or less relative to the entire pressure-sensitive adhesive.

The pressure-sensitive adhesive according to the exemplary embodiment may contain additives, such as surfactants, dispersion stabilizers, viscosity modifiers, pH modifiers, antioxidants, UV absorbers, preservatives, and antifungal agents.

Cartridge

A cartridge according to an exemplary embodiment stores the composite resin particles or the pressure-sensitive adhesive according to the exemplary embodiment and is attachable to or detachable from a printed material producing apparatus. When the cartridge is installed in a printed material producing apparatus, the cartridge is connected to a disposing unit of the printed material producing apparatus through a feed tube. The disposing unit disposes pressure-responsive particles on a recording medium.

The composite resin particles are fed to the disposing unit from the cartridge. When the composite particles stored in the cartridge runs short, the cartridge is replaced.

Printed Material Producing Apparatus, Method for Producing Printed Material, Printed Material The printed material producing apparatus according to the exemplary embodiment includes: a disposing unit that stores the composite resin particles or the pressure-sensitive adhesive according to the exemplary embodiment and disposes the composite resin particles on a recording medium; and a pressure-bonding unit that folds the recording medium and pressure-bonds the folded recording medium or stacks the recording medium and another recording medium on top of each other and pressure-bonds the stacked recording media to each other.

The printed material according to the exemplary embodiment is any printed material bonded with the composite resin particles or the pressure-sensitive adhesive according to the exemplary embodiment.

Examples of the printed material according to the exemplary embodiment include a printed material formed by bonding the opposing surfaces of a folded recording medium to each other with the composite resin particles, and a printed material formed by bonding the opposing surfaces of stacked recording media to each other with the composite resin particles.

For example, the disposing unit may include an applying device that applies the composite resin particles to a recording medium and may further include a fixing device that fixes the composite resin particles on the recording medium to the recording medium.

For example, the pressure-bonding unit includes a folding device that folds the recording medium having the composite resin particles thereon or a stacking device that stacks the recording medium having the composite resin particles thereon and another recording medium on top of each other, and a pressure device that presses the folded recording medium or the stacked recording media.

The pressure device of the pressure-bonding unit applies pressure to the recording medium having the composite resin particles thereon. The composite resin particles are thus fluidized on the recording medium and exhibit adhesiveness.

The printed material producing apparatus according to the exemplary embodiment executes a method for producing a printed material according to an exemplary embodiment. The method for producing a printed material according to the exemplary embodiment includes: a disposing step of disposing the composite resin particles on a recording medium by using the composite resin particles or the pressure-sensitive adhesive according to the exemplary embodiment; and a pressure-bonding step of folding the recording medium and pressure-bonding the folded recording medium or stacking the recording medium and another recording medium on top of each other and pressure-bonding the recording media to each other.

For example, the disposing step may include a step of applying the pressure-responsive particles to a recording medium and may further include a step of fixing the pressure-responsive particles on the recording medium to the recording medium.

For example, the pressure-bonding step includes a folding step of folding the recording medium or a stacking step of stacking the recording medium and another recording medium on top of each other, and a pressing step of pressing the folded recording medium or the stacked recording media.

The composite resin particles or the pressure-sensitive adhesive may be disposed on the entire surface of the recording medium or may be disposed on part of the recording medium. The composite resin particles are disposed to form one layer or two or more layers on the recording medium. A layer of the composite resin particles may be continuous in the plane direction of the recording medium or may be discontinuous in the plane direction of the recording medium. In a layer of the composite resin particles, the composite resin particles may be arranged in the form of particles, or the composite resin particles may be arranged such that adjacent composite resin particles fuse with each other.

The amount of the composite resin particles (may be transparent composite resin particles) on the recording medium in a region where the composite resin particles are disposed is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The layer thickness of the composite resin particles (may be transparent composite resin particles) on the recording medium is, for example, 0.2 μm or more and 25 μm or less, 0.4 μm or more and 20 μm or less, or 0.6 μm or more and 15 μm or less.

Examples of the recording medium used in the printed material producing apparatus according to the exemplary embodiment include paper, coated paper having the surface coated with resin or the like, fabrics, nonwoven fabrics, resin films, and resin sheets. The recording medium may have an image on one side or both sides.

An example of the printed material producing apparatus according to the exemplary embodiment will be described below, but this exemplary embodiment is not limited to this example.

FIG. 1 is a schematic structural view of one example of the printed material producing apparatus according to the exemplary embodiment. The printed material producing apparatus shown in FIG. 1 includes a disposing unit 100 and a pressure-bonding unit 200 downstream of the disposing unit 100. The arrows indicate the transport direction of a recording medium.

The disposing unit 100 is a device that disposes the pressure-sensitive adhesive on a recording medium P by using the pressure-sensitive adhesive. An image is formed in advance on one side or both sides of the recording medium P.

The disposing unit 100 includes an applying device 110 and a fixing device 120 downstream of the applying device 110.

The applying device 110 applies composite resin particles M to a recording medium P. Examples of the application method used in the applying device 110 include spraying, bar coating, die coating, knife coating, roll coating, reverse roll coating, gravure coating, screen printing, an ink-jet method, lamination, and electrophotography. According to the application method, a liquid composition prepared by dispersing the composite resin particles M in a dispersion medium may be used in the applying device 110.

The recording medium P having the composite resin particles M applied by the applying device 110 is transported to the fixing device 120.

Examples of the fixing device 120 include a heating device that includes a heat source and heats the composite resin particles on a recording medium P passing through the device to fix the composite resin particles M to the recording medium P; a pressure device that includes a pair of pressure members (roll/roll, belt/roll) and presses a recording medium P passing through the device to fix the composite resin particles M to the recording medium P; and a pressing and heating device that includes a pair of pressure members (roll/roll, belt/roll) having a heat source inside and presses and heats a recording medium P passing through the device to fix the composite resin particles M to the recording medium P.

When the fixing device 120 has a heat source, the surface temperature of the recording medium P heated by the fixing device 120 is preferably 10° C. or higher and 80° C. or lower, more preferably 20° C. or higher and 60° C. or lower, still more preferably 30° C. or higher and 50° C. or lower.

When the fixing device 120 has pressure members, the pressure applied to the recording medium P by the pressure members may be lower than the pressure applied to a recording medium P2 by a pressure device 230.

As the recording medium P passes through the disposing unit 100, the recording medium P becomes a recording medium P1 having the composite resin particles M on an image. The recording medium P1 is transported toward the pressure-bonding unit 200.

In the printed material producing apparatus according to the exemplary embodiment, the disposing unit 100 and the pressure-bonding unit 200 may be adjacent to each other or may be distant from each other. When the disposing unit 100 and the pressure-bonding unit 200 are distant from each other, the disposing unit 100 is connected to the pressure-bonding unit 200 through, for example, a transporting unit (e.g., a belt conveyor) that transports the recording medium P1.

The pressure-bonding unit 200 includes a folding device 220 and the pressure device 230 and folds the recording medium P1 and pressure-bonds the folded recording medium P1.

The folding device 220 folds the recording medium P1 passing through the device to make a folded recording medium P2. The recording medium P2 is, for example, folded in two, three, or four. The recording medium P2 may be partially folded. The composite resin particles M are disposed on at least part of at least one of two opposing surfaces of the recording medium P2.

The folding device 220 may have a pair of pressure members (e.g., roll/roll, belt/roll) that applies pressure to the recording medium P2. The pressure applied to the recording medium P2 by the pressure members of the folding device 220 may be lower than the pressure applied to the recording medium P2 by the pressure device 230.

The pressure-bonding unit 200 may include, instead of the folding device 220, a stacking device that stacks the recording medium P1 and another recording medium on top of each other. The recording medium P1 and another recording medium may be stacked on top of each other in such a manner that, for example, another recording medium is stacked on the recording medium P1 or other recording media are separately stacked on different areas of the recording medium P1. Another recording medium or each of other recording media may be a recording medium having an image formed in advance on one side or both sides, a recording medium having no image formed thereon, or a pressure-bonded printed material produced in advance.

The recording medium P2 discharged from the folding device 220 (or the stacking device) is transported toward the pressure device 230.

The pressure device 230 includes a pair of pressure members (i.e., pressure rolls 231 and 232). The pressure roll 231 and the pressure roll 232 are in contact with each other on their outer circumferential surfaces and press against each other to apply pressure to the recording medium P2 passing therebetween. A pair of pressure members in the pressure device 230 is not limited to a combination of a pressure roll and a pressure roll, and may be a combination of a pressure roll and a pressure belt or a combination of a pressure belt and a pressure belt.

Upon application of pressure to the recording medium P2 passing through the pressure device 230, the composite resin particles M are fluidized on the recording medium P2 under pressure and exhibit adhesiveness.

The pressure device 230 may or may not have, inside the device, a heat source (e.g., a halogen heater) for heating the recording medium P2. The absence of a heat source in the pressure device 230 does not exclude the possibility that heat generation from a motor or the like in the pressure device 230 increases the temperature in the pressure device 230 to an environmental temperature or higher.

When the recording medium P2 passes through the pressure device 230, the opposing surfaces of the folded recording medium P2 are bonded to each other with the fluidized composite resin particles M to produce a pressure-bonded printed material P3. Two opposing surfaces of the pressure-bonded printed material P3 are partially or entirely bonded to each other.

The completed pressure-bonded printed material P3 is discharged from the pressure device 230.

A first form of the pressure-bonded printed material P3 is a pressure-bonded printed material formed by bonding the opposing surfaces of a folded recording medium to each other with the composite resin particles M. The pressure-bonded printed material P3 in this form is produced by a printed material producing apparatus including the folding device 220.

A second form of the pressure-bonded printed material P3 is a pressure-bonded printed material formed by bonding the opposing surfaces of stacked recording media to each other with the composite resin particles M. The pressure-bonded printed material P3 in this form is produced by a pressure-bonded printed material producing apparatus including a stacking device.

The printed material producing apparatus according to the exemplary embodiment is not limited to an apparatus in which the recording media P2 are continuously transported from the folding device 220 (or the stacking device) to the pressure device 230. The printed material producing apparatus according to the exemplary embodiment may be an apparatus in which recording media P2 discharged from the folding device 220 (or the stacking device) are stored and, after the storage of recording media P2 reaches a predetermined amount, the recording media P2 are transported to the pressure device 230.

In the printed material producing apparatus according to the exemplary embodiment, the folding device 220 (or the stacking device) and the pressure device 230 may be adjacent to each other or may be distant from each other. When the folding device 220 (or the stacking device) and the pressure device 230 are distant from each other, the folding device 220 (or the stacking device) is connected to the pressure device 230 through, for example, a transporting unit (e.g., a belt conveyor) that transports the recording medium P2.

The printed material producing apparatus according to the exemplary embodiment may include a cutting unit that cuts a recording medium into a predetermined size. Examples of the cutting unit include a cutting unit that is disposed between the disposing unit 100 and the pressure-bonding unit 200 and cuts away a region that is part of the recording medium P1 and that has no composite resin particles M thereon; a cutting unit that is disposed between the folding device 220 and the pressure device 230 and cuts away a region that is part of the recording medium P2 and that has no composite resin particles M thereon; and a cutting unit that is disposed downstream of the pressure-bonding unit 200 and cuts away a region that is part of the pressure-bonded printed material P3 and that is not bonded with the composite resin particles M.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the disposing step and the pressure-bonding step, and then cuts the long pressure-bonded printed material into a predetermined size.

The printed material producing apparatus according to the exemplary embodiment may further include a color image forming unit that forms a color image on a recording medium by using a color material. Examples of the color image forming unit include a unit that forms a color ink image on a recording medium by an ink-jet system using color ink as a color material, and a unit that forms a color image on a recording medium by an electrophotographic system using a color electrostatic charge image developer.

The producing apparatus having the above structure executes the method for producing a printed material according to the exemplary embodiment further including a color image forming step of forming a color image on a recording medium by using a color material. Examples of the color image forming step include a step of forming a color ink image on a recording medium by an ink-jet system using color ink as a color material, and a step of forming a color image on a recording medium by an electrophotographic system using a color electrostatic charge image developer.

Sheet for Producing Printed Material and Method for Producing Sheet for Producing Printed Material A sheet for producing a printed material according to an exemplary embodiment includes a substrate and the pressure-responsive particles according to the exemplary embodiment disposed on the substrate. The sheet for producing a printed material according to the exemplary embodiment may have a substrate and an adhesive material according to an exemplary embodiment disposed on the substrate.

The sheet for producing a printed material according to the exemplary embodiment is produced by using the pressure-responsive particles according to the exemplary embodiment. The pressure-responsive particles on the substrate may or may not keep the same particle shape as before being disposed on the substrate.

The sheet for producing a printed material according to the exemplary embodiment is used as, for example, a masking sheet to be stacked on and bonded to a recording medium in order to conceal information recorded on the recording medium; and a release sheet used to provide an adhesive layer on a recording medium when recording media are stacked and bonded to each other.

Examples of the substrate used in the sheet for producing a printed material according to the exemplary embodiment include paper, coated paper having the surface coated with resin or the like, fabrics, nonwoven fabrics, resin films, and resin sheets. The substrate may have an image formed on one side or both sides.

In the sheet for producing a printed material according to the exemplary embodiment, the pressure-responsive particles may be disposed on the entire surface of the substrate or may be disposed on part of the substrate. The pressure-responsive particles are disposed to form one layer or two or more layers on the substrate. A layer of the pressure-responsive particles may be continuous in the plane direction of the substrate or may be discontinuous in the plane direction of the substrate. In a layer of the pressure-responsive particles, the pressure-responsive particles may be arranged in the form of particles, or may be arranged such that adjacent pressure-responsive particles fuse with each other.

The amount of the pressure-responsive particles on the substrate in a region where the pressure-responsive particles are disposed is, for example, 0.5 $g/m^2$ or more and 50 $g/m^2$ or less, 1 $g/m^2$ or more and 40 $g/m^2$ or less, or 1.5 $g/m^2$ or more and 30 $g/m^2$ or less. The layer thickness of the pressure-responsive particles on the substrate is, for example, 0.2 μm or more and 25 μm or less, 0.4 μm or more and 20 μm or less, or 0.6 μm or more and 15 μm or less.

The sheet for producing a printed material according to the exemplary embodiment is produced by, for example, a production method including a disposing step of disposing the pressure-responsive particles according to the exemplary embodiment on the substrate.

For example, the disposing step may include an applying step of applying the pressure-responsive particles to the substrate and may further include a fixing step of fixing the pressure-responsive particles on the substrate to the substrate.

The applying step is achieved by an application method, such as spraying, bar coating, die coating, knife coating, roll coating, reverse roll coating, gravure coating, screen printing, an ink-jet method, lamination, or electrophotography. According to the application method in the applying step, a liquid composition prepared by dispersing the pressure-responsive particles in a dispersion medium may be used in the applying step.

Examples of the fixing step include a heating step of heating the pressure-responsive particles on the substrate to fix the pressure-responsive particles to the substrate; a pressing step of pressing the substrate having the pressure-responsive particles applied thereon with a pair of pressure members (roll/roll, belt/roll) to fix the pressure-responsive particles to the substrate; and a pressing and heating step of pressing and heating the substrate having the pressure-responsive particles applied thereon with a pair of pressure members (roll/roll, belt/roll) having a heat source inside to fix the pressure-responsive particles to the substrate.

Pressure-Responsive Resin

A method for producing a pressure-responsive resin according to an exemplary embodiment includes the method for producing a composite resin particle dispersion according to the exemplary embodiment.

The pressure-responsive resin according to the exemplary embodiment may contain the composite resin particles produced by the method for producing a composite resin particle dispersion according to the exemplary embodiment or may contain a resin formed by aggregation and coalescence of the composite resin particles.

The method for aggregating and coalescing the composite resin particles is not limited and may be any known aggregation-coalescence method.

Production of Printed Material by Electrophotographic System

An exemplary embodiment of application of the composite resin particles to an electrophotographic system will be described. In the electrophotographic system, the composite resin particles may be used as a binder resin for the toner for electrostatic charge image development.

The method for producing a toner for electrostatic charge image development according to the exemplary embodiment uses the composite resin particle dispersion produced by the method for producing a composite resin particle dispersion according to the exemplary embodiment.

The toner for electrostatic charge image development according to the exemplary embodiment contains a resin formed by aggregation and coalescence of the composite resin particles contained in the composite resin particle dispersion produced by the method for producing a composite resin particle dispersion according to the exemplary embodiment.

A pressure-responsive toner is easily produced by forming toner particles through aggregation and coalescence of the composite resin particles.

The method for producing a toner for electrostatic charge image development according to the exemplary embodiment is not limited as long as the method uses the composite resin particle dispersion produced by the method for producing a composite resin particle dispersion. The method for producing a toner for electrostatic charge image development according to the exemplary embodiment includes other known steps.

Electrostatic Charge Image Developer

The electrostatic charge image developer according to the exemplary embodiment contains a toner containing a resin formed by aggregation and coalescence of the composite resin particles produced by the method for producing a composite resin particle dispersion according to the exemplary embodiment. The electrostatic charge image developer according to the exemplary embodiment may be a one-component developer containing only a toner, or may be a two-component developer containing a mixture of a toner and a carrier.

The carrier is not limited and may be a known carrier. Examples of the carrier include a coated carrier obtained by coating, with resin, the surface of a core made of magnetic powder; a magnetic powder-dispersed carrier in which magnetic powder is dispersed and mixed in matrix resin; and a resin-impregnated carrier in which porous magnetic powder is impregnated with resin. The magnetic powder-dispersed carrier or the resin-impregnated carrier may be a carrier having constituent particles as a core and a resin coating the surfaces of the constituent particles.

Examples of the magnetic powder include powders made of magnetic metals, such as iron, nickel, and cobalt; and powders made of magnetic oxides, such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond, and modified products thereof, fluorocarbon resin, polyester, polycarbonate, phenolic resin, and epoxy resin. The coating resin and the matrix resin may contain other additives, such as conductive particles. Examples of the conductive particles include particles made of metals, such as gold, silver, and copper; and particles made of carbon black, titanium oxide, zinc oxide, tin oxide, barium sulfate, aluminum borate, and potassium titanate.

The surface of the core is coated with resin by, for example, a coating method using a coating layer-forming solution in which a coating resin and various additives (used as desired) are dissolved in an appropriate solvent. The solvent is not limited and may be selected in consideration of the type of resin used, coating suitability, and the like.

Specific examples of the resin coating method include an immersion method that involves immersing the core in the coating layer-forming solution; a spray method that involves spraying the coating layer-forming solution onto the surface of the core; a fluidized bed method that involves spraying the coating layer-forming solution onto the core while floating the core in air flow; and a kneader-coater method that involves mixing the core of the carrier and the coating layer-forming solution in a kneader-coater, and then removing the solvent.

The mixing ratio (mass ratio) of the pressure-responsive particles to the carrier in the two-component developer is preferably from 1:100 to 30:100 (=pressure-responsive particles:carrier), more preferably from 3:100 to 20:100.

Printed Material Producing Apparatus, Method for Producing Printed Material

A printed material producing apparatus using an electrophotographic system includes: a disposing unit that stores a developer containing the toner and disposes the toner on a recording medium by an electrophotographic system; and a pressure-bonding unit that folds the recording medium and pressure-bonds the folded recording medium or that stacks the recording medium and another recording medium on top of each other and pressure-bonds the stacked recording media to each other.

The printed material producing apparatus according to the exemplary embodiment executes a method for producing a printed material using an electrophotographic system. The method for producing a printed material according to the exemplary embodiment includes: a disposing step of disposing the toner on a recording medium by an electrophotographic system using a developer containing the toner; and a pressure-bonding step of folding the recording medium and pressure-bonding the folded recording medium or stacking the recording medium and another recording medium on top of each other and pressure-bonding the recording media to each other.

The disposing unit in the printed material producing apparatus according to the exemplary embodiment includes: for example, a photoreceptor;

a charging unit that charges the surface of the photoreceptor;

an electrostatic charge image forming unit that forms an electrostatic charge image on the charged surface of the photoreceptor;

a developing unit that stores the electrostatic charge image developer according to the exemplary embodiment and develops the electrostatic charge image on the surface of the photoreceptor by using the electrostatic charge image developer to form a toner-applied section; and a transfer unit that transfers the toner-applied section on the surface of the photoreceptor to the surface of a recording medium.

The disposing unit may further include a fixing unit that fixes the toner-applied section which has been transferred to the surface of the recording medium.

The disposing step in the method for producing a printed material according to the exemplary embodiment includes: for example, a charging step of charging the surface of the photoreceptor;

an electrostatic charge image forming step of forming an electrostatic charge image on the charged surface of the photoreceptor;

a developing step of developing the electrostatic charge image on the surface of the photoreceptor by using the electrostatic charge image developer according to the exemplary embodiment to form a toner-applied section; and a transferring step of transferring the toner-applied section on the surface of the photoreceptor to the surface of a recording medium.

The disposing step may further include a fixing step of fixing the toner-applied section which has been transferred to the surface of the recording medium.

Examples of the disposing unit include devices, such as a direct transfer-type device in which a toner-applied section formed on the surface of a photoreceptor is directly transferred to a recording medium; an intermediate transfer-type device in which a toner-applied section formed on the surface of a photoreceptor is first transferred to the surface of an intermediate transfer body, and the toner-applied section, which has been transferred to the surface of the intermediate transfer body, is second transferred to the surface of a recording medium; a device including a cleaning unit that cleans the surface of a photoreceptor before charging after transfer of a toner-applied section; and a device including a discharging unit that discharges the surface of a photoreceptor by irradiating the surface of the photoreceptor with discharging light before charging after transfer of a toner-applied section. When the disposing unit is an intermediate transfer-type device, the transfer unit includes, for example, an intermediate transfer body having the surface to which a toner-applied section is transferred, a first transfer unit that first transfers the toner-applied section on the surface of the photoreceptor to the surface of the intermediate transfer body, and a second transfer unit that second transfers the toner-applied section, which has been transferred to the surface of the intermediate transfer body, to the surface of a recording medium.

In the disposing unit, a section including the developing unit may have a cartridge structure (i.e., process cartridge) that is attachable to and detachable from the disposing unit. The process cartridge may be, for example, a process cartridge that stores the electrostatic charge image developer according to the exemplary embodiment and that includes the developing unit.

The pressure-bonding unit in the printed material producing apparatus according to the exemplary embodiment applies pressure to a recording medium having the toner thereon. The toner is thus fluidized on the recording medium and exhibits adhesiveness. The pressure applied to the recording medium by the pressure-bonding unit in order to fluidize the toner is preferably 3 MPa or more and 300 MPa or less, more preferably 10 MPa or more and 200 MPa or less, still more preferably 30 MPa or more and 150 MPa or less.

The toner may be disposed on the entire surface of the recording medium or may be disposed on part of the recording medium. The toner is disposed to form one layer or two or more layers on the recording medium. A layer of the toner may be continuous in the plane direction of the recording medium or may be discontinuous in the plane direction of the recording medium. In a layer of the toner, the pressure-responsive particles may be arranged in the form of particles, or adjacent toner particles may fuse with each other.

The amount of the toner on the recording medium in a region where the toner is disposed is, for example, 0.5 g/m$^2$ or more and 50 g/m$^2$ or less, 1 g/m$^2$ or more and 40 g/m$^2$ or less, or 1.5 g/m$^2$ or more and 30 g/m$^2$ or less. The layer thickness of the pressure-responsive particles according to the exemplary embodiment (may be transparent pressure-responsive particles) on the recording medium is, for example, 0.2 μm or more and 25 μm or less, 0.4 μm or more and 20 μm or less, or 0.6 μm or more and 15 μm or less.

Examples of the recording medium used in the printed material producing apparatus according to the exemplary embodiment include paper, coated paper having the surface coated with resin or the like, fabrics, nonwoven fabrics, resin films, and resin sheets. The recording medium may have an image on one side or both sides.

An example of the printed material producing apparatus according to the exemplary embodiment using an electrophotographic system will be described below, but this exemplary embodiment is not limited to this example.

Figure 2:
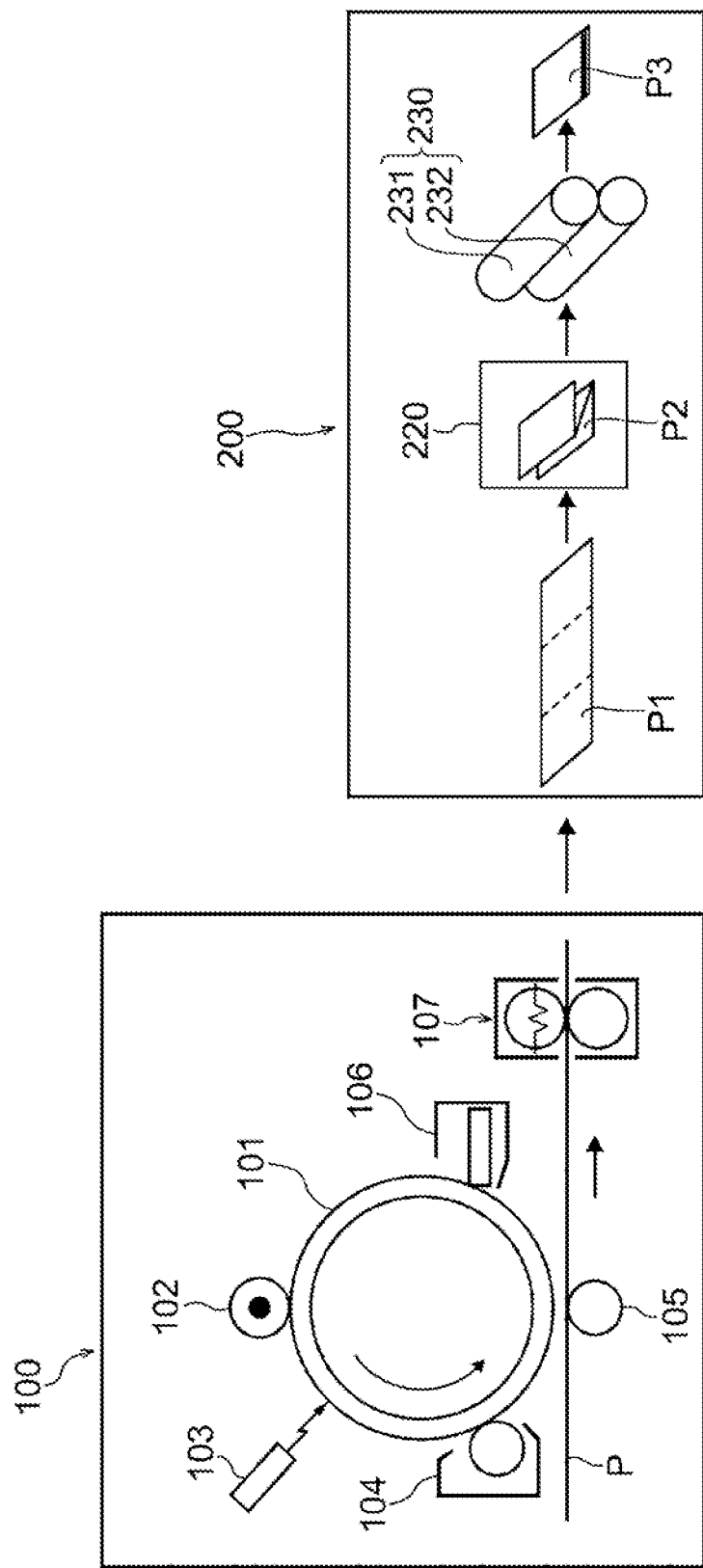
FIG. 2 is a schematic view of another example of the printed material producing apparatus according to an exemplary embodiment.

FIG. 2 is a schematic structural view of one example of the printed material producing apparatus according to the exemplary embodiment. The printed material producing apparatus shown in FIG. 2 includes a disposing unit 100 and a pressure-bonding unit 200 downstream of the disposing unit 100. The arrows indicate the rotation direction of a photoreceptor or the transport direction of a recording medium.

The disposing unit 100 is a direct transfer-type device that disposes the toner on a recording medium P by an electrophotographic system using a developer containing the toner. An image is formed in advance on one side or both sides of the recording medium P.

The disposing unit 100 has a photoreceptor 101. The photoreceptor 101 is surrounded by, in sequence, a charging roll (an example of the charging unit) 102, which charges the surface of the photoreceptor 101, an exposure device (an example of the electrostatic charge image forming unit) 103, which exposes the charged surface of the photoreceptor 101 to a laser beam to form an electrostatic charge image, a developing device (an example of the developing unit) 104, which supplies toner to the electrostatic charge image to develop the electrostatic charge image, a transfer roll (an example of the first transfer unit) 105, which transfers the developed toner-applied section to a recording medium P, and a photoreceptor cleaning device (an example of the cleaning unit) 106, which removes the toner remaining on the surface of the photoreceptor 101 after the transfer.

The operation of the disposing unit 100 for disposing toner on the recording medium will be described.

First, the charging roll 102 charges the surface of the photoreceptor 101. The charged surface of the photoreceptor 101 is irradiated with a laser beam from the exposure device 103 in accordance with image data sent from a controller (not shown). An electrostatic charge image having a toner disposition pattern is accordingly disposed on the surface of the photoreceptor 101.

The electrostatic charge image formed on the photoreceptor 101 rotates to a development position as the photoreceptor 101 runs. At the development position, the electrostatic charge image on the photoreceptor 101 is developed by the developing device 104 to form a toner-applied section.

The developing device 104 stores a developer containing at least a toner and a carrier. The toner is triboelectrically charged by stirring the toner together with the carrier inside the developing device 104 and held on a developer roll. As the surface of the photoreceptor 101 passes through the developing device 104, the toner electrostatically adheres to the electrostatic charge image on the surface of the photoreceptor 101, whereby the electrostatic charge image is developed with the toner. The photoreceptor 101 having the toner-applied section thereon subsequently runs, and the toner-applied section on the photoreceptor 101 is transported to a transfer position.

Upon the toner-applied section on the photoreceptor 101 reaching the transfer position, a transfer bias is applied to the transfer roll 105 so that an electrostatic force from the photoreceptor 101 toward the transfer roll 105 acts on the toner-applied section, transferring the toner-applied section on the photoreceptor 101 to the recording medium P.

The toner remaining on the photoreceptor 101 is removed and collected by the photoreceptor cleaning device 106. The photoreceptor cleaning device 106 is, for example, a cleaning blade or a cleaning brush. The photoreceptor cleaning device 106 may be a cleaning brush in order to prevent a phenomenon in which the toner according to the exemplary embodiment remaining on the surface of the photoreceptor is fluidized under pressure and adheres to the surface of the photoreceptor to form a layer.

The recording medium P to which the toner-applied section has been transferred is transported to a fixing device (an example of the fixing unit) 107. The fixing device 107 is, for example, a pair of fixing members (e.g., roll/roll, belt/roll). The disposing unit 100 may not include the fixing device 107 but may include the fixing device 107 in order to prevent the toner according to the exemplary embodiment from falling off the recording medium P. The pressure applied to the recording medium P by the fixing device 107 may be lower than the pressure applied to a recording medium P2 by a pressure device 230. Specifically, the pressure may be 0.2 MPa or more and 1 MPa or less.

The fixing device 107 may or may not have, inside the device, a heat source (e.g., a halogen heater) for heating the recording medium P. When the fixing device 107 has a heat source inside, the surface temperature of the recording medium P heated by the heat source is preferably 150° C. or higher and 220° C. or lower, more preferably 155° C. or higher and 210° C. or lower, still more preferably 160° C. or higher and 200° C. or lower. The absence of a heat source in the fixing device 107 does not exclude the possibility that heat generation from a motor or the like in the disposing unit 100 increases the temperature in the fixing device 107 to an environmental temperature or higher.

As the recording medium P passes through the disposing unit 100, the recording medium P becomes a recording medium P1 having the toner according to the exemplary embodiment on an image. The recording medium P1 is transported toward the pressure-bonding unit 200.

In the printed material producing apparatus according to the exemplary embodiment, the disposing unit 100 and the pressure-bonding unit 200 may be adjacent to each other or may be distant from each other. When the disposing unit 100 and the pressure-bonding unit 200 are distant from each other, the disposing unit 100 is connected to the pressure-bonding unit 200 through, for example, a transporting unit (e.g., a belt conveyor) that transports the recording medium P1.

The pressure-bonding unit 200 includes a folding device 220 and the pressure device 230 and folds the recording medium P1 and pressure-bonds the folded recording medium P1.

The folding device 220 folds the recording medium P1 passing through the device to make a folded recording medium P2. The recording medium P2 is, for example, folded in two, three, or four. The recording medium P2 may be partially folded. The toner is disposed on at least part of at least one of two opposing surfaces of the recording medium P2.

The folding device 220 may have a pair of pressure members (e.g., roll/roll, belt/roll) that applies pressure to the recording medium P2. The pressure applied to the recording medium P2 by the pressure members of the folding device 220 may be lower than the pressure applied to a recording medium P2 by the pressure device 230. Specifically, the pressure may be 1 MPa or more and 10 MPa or less.

The pressure-bonding unit 200 may include, instead of the folding device 220, a stacking device that stacks the recording medium P1 and another recording medium on top of each other. The recording medium P1 and another recording medium may be stacked on top of each other in such a manner that, for example, another recording medium is stacked on the recording medium P1 or other recording media are separately stacked on different areas of the recording medium P1. Another recording medium or each of other recording media may be a recording medium having an image formed in advance on one side or both sides, a recording medium having no image formed thereon, or a pressure-bonded printed material produced in advance.

The recording medium P2 discharged from the folding device 220 (or the stacking device) is transported toward the pressure device 230.

The pressure device 230 includes a pair of pressure members (i.e., pressure rolls 231 and 232). The pressure roll 231 and the pressure roll 232 are in contact with each other on their outer circumferential surfaces and press against each other to apply pressure to the recording medium P2 passing therebetween. A pair of pressure members in the pressure device 230 is not limited to a combination of a pressure roll and a pressure roll, and may be a combination of a pressure roll and a pressure belt or a combination of a pressure belt and a pressure belt.

Upon application of pressure to the recording medium P2 passing through the pressure device 230, the toner is fluidized on the recording medium P2 under pressure and exhibits adhesiveness. The pressure applied to the recording medium P2 by the pressure device 230 is preferably 3 MPa or more and 300 MPa or less, more preferably 10 MPa or more and 200 MPa or less, still more preferably 30 MPa or more and 150 MPa or less.

The pressure device 230 may or may not have, inside the device, a heat source (e.g., a halogen heater) for heating the recording medium P2. When the pressure device 230 has a heat source inside, the surface temperature of the recording medium P2 heated by the heat source is preferably 30° C. or higher and 120° C. or lower, more preferably 40° C. or higher and 100° C. or lower, still more preferably 50° C. or higher and 90° C. or lower. The absence of a heat source in the pressure device 230 does not exclude the possibility that heat generation from a motor or the like in the pressure device 230 increases the temperature in the pressure device 230 to an environmental temperature or higher.

When the recording medium P2 passes through the pressure device 230, the opposing surfaces of the folded recording medium P2 are bonded to each other with the toner to produce a pressure-bonded printed material P3. The opposing surfaces of the pressure-bonded printed material P3 are partially or entirely bonded to each other.

The completed pressure-bonded printed material P3 is discharged from the pressure device 230.

A first form of the pressure-bonded printed material P3 is a pressure-bonded printed material formed by bonding the opposing surfaces of a folded recording medium to each other with the toner. The pressure-bonded printed material P3 in this form is produced by a printed material producing apparatus including the folding device 220.

A second form of the pressure-bonded printed material P3 is a pressure-bonded printed material formed by bonding the opposing surfaces of stacked recording media to each other with the toner. The pressure-bonded printed material P3 in this form is produced by a pressure-bonded printed material producing apparatus including a stacking device.

The printed material producing apparatus according to the exemplary embodiment is not limited to an apparatus in which the recording media P2 are continuously transported from the folding device 220 (or the stacking device) to the pressure device 230. The printed material producing apparatus according to the exemplary embodiment may be an apparatus in which recording media P2 discharged from the folding device 220 (or the stacking device) are stored and, after the storage of recording media P2 reaches a predetermined amount, the recording media P2 are transported to the pressure device 230.

In the printed material producing apparatus according to the exemplary embodiment, the folding device 220 (or the stacking device) and the pressure device 230 may be adjacent to each other or may be distant from each other. When the folding device 220 (or the stacking device) and the pressure device 230 are distant from each other, the folding device 220 (or the stacking device) is connected to the pressure device 230 through, for example, a transporting unit (e.g., a belt conveyor) that transports the recording medium P2.

The printed material producing apparatus according to the exemplary embodiment may include a cutting unit that cuts a recording medium into a predetermined size. Examples of the cutting unit include a cutting unit that is disposed between the disposing unit 100 and the pressure-bonding unit 200 and cuts away a region that is part of the recording medium P1 and that has no toner thereon; a cutting unit that is disposed between the folding device 220 and the pressure device 230 and cuts away a region that is part of the recording medium P2 and that has no toner thereon; and a cutting unit that is disposed downstream of the pressure-bonding unit 200 and cuts away a region that is part of the pressure-bonded printed material P3 and that is not bonded with the toner.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the disposing step and the pressure-bonding step, and then cuts the long pressure-bonded printed material into a predetermined size.

The printed material producing apparatus according to the exemplary embodiment may further include a color image forming unit that forms a color image on a recording medium by an electrophotographic system using a color electrostatic charge image developer. The color image forming unit includes: for example, a photoreceptor;

a charging unit that charges the surface of the photoreceptor;

an electrostatic charge image forming unit that forms an electrostatic charge image on the charged surface of the photoreceptor;

a developing unit that stores a color electrostatic charge image developer and develops the electrostatic charge image on the surface of the photoreceptor by using the color electrostatic charge image developer to form a color toner image;

a transfer unit that transfers the color toner image on the surface of the photoreceptor to the surface of a recording medium; and a thermal fixing unit that thermally fixes the color toner image which has been transferred to the surface of the recording medium.

The producing apparatus having the above structure executes the method for producing a printed material according to the exemplary embodiment further including a color image forming step of forming a color image on a recording medium by an electrophotographic system using a color electrostatic charge image developer. Specifically, the color image forming step includes:

a charging step of charging the surface of the photoreceptor;

an electrostatic charge image forming step of forming an electrostatic charge image on the charged surface of the photoreceptor;

a developing step of developing the electrostatic charge image on the surface of the photoreceptor by using a color electrostatic charge image developer to form a color toner image;

a transferring step of transferring the color toner image on the surface of the photoreceptor to the surface of a recording medium; and a thermal fixing step of thermally fixing the color toner image which has been transferred to the surface of the recording medium.

Examples of the color image forming unit in the printed material producing apparatus according to the exemplary embodiment include devices, such as a direct transfer-type device in which a color toner image formed on the surface of a photoreceptor is directly transferred to a recording medium; an intermediate transfer-type device in which a color toner image formed on the surface of a photoreceptor is first transferred to the surface of an intermediate transfer body, and the color toner image, which has been transferred to the surface of the intermediate transfer body, is second transferred to the surface of a recording medium; a device including a cleaning unit that cleans the surface of a photoreceptor before charging after transfer of a color toner image; and a device including a discharging unit that discharges the surface of a photoreceptor by irradiating the surface of the photoreceptor with discharging light before charging after transfer of a color toner image. When the color image forming unit is an intermediate transfer-type device, the transfer unit includes, for example, an intermediate transfer body having the surface to which a color toner image is transferred, a first transfer unit that first transfers the color toner image on the surface of the photoreceptor to the surface of the intermediate transfer body, and a second transfer unit that second transfers the color toner image, which has been transferred to the surface of the intermediate transfer body, to the surface of a recording medium.

When the disposing unit for a developer containing the toner and the color image forming unit are intermediate transfer-type devices in the printed material producing apparatus according to the exemplary embodiment, the disposing unit and the color image forming unit may share the intermediate transfer body and the second transfer unit.

In the printed material producing apparatus according to the exemplary embodiment, the disposing unit for a developer containing the toner and the color image forming unit may share the thermal fixing unit.

An example of the printed material producing apparatus according to the exemplary embodiment including the color image forming unit will be described below, but the exemplary embodiment is not limited to this example. The main parts shown in the figure will be described below, and other parts will not be described.

Figure 3:
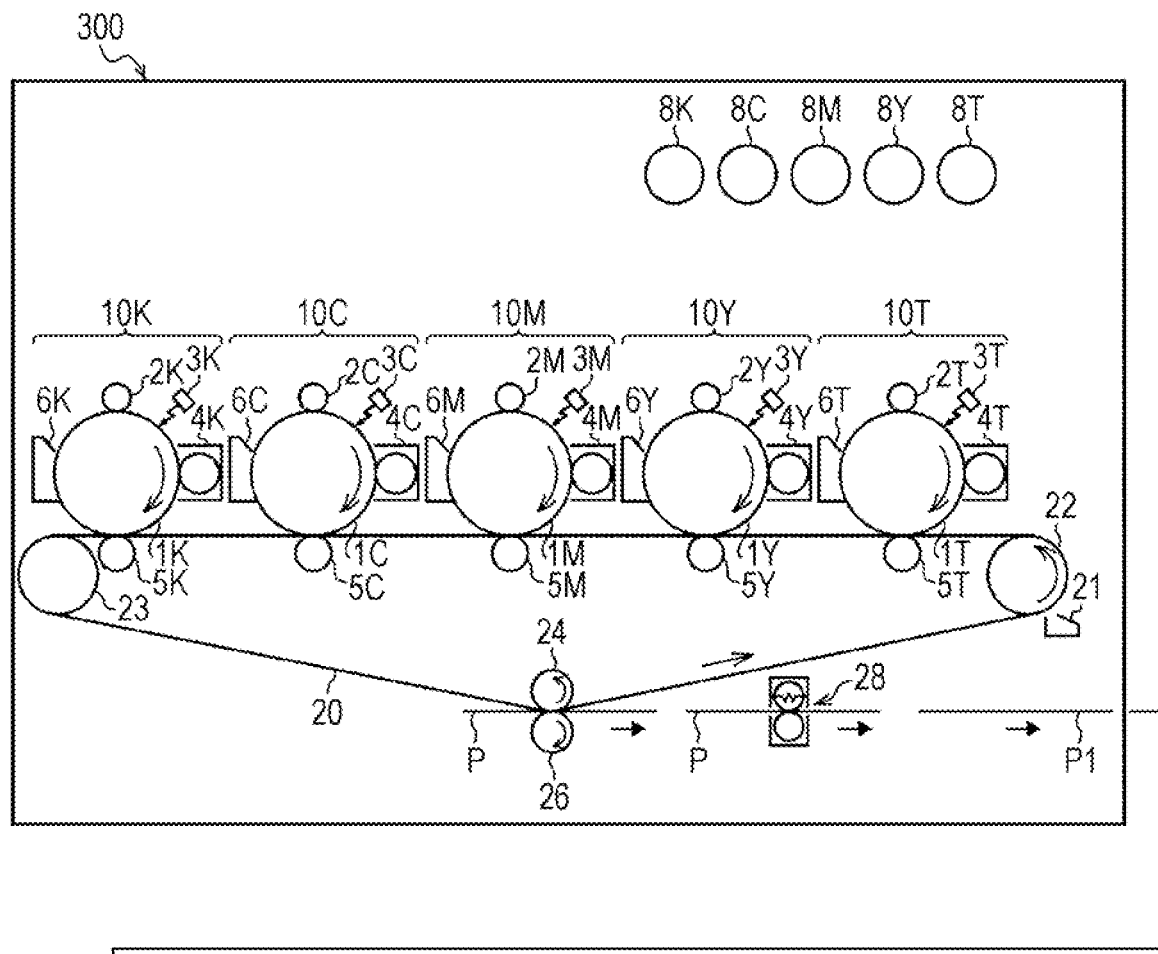
FIG. 3 is a schematic view of the other example of the printed material producing apparatus according to an exemplary embodiment.
Figure 3:
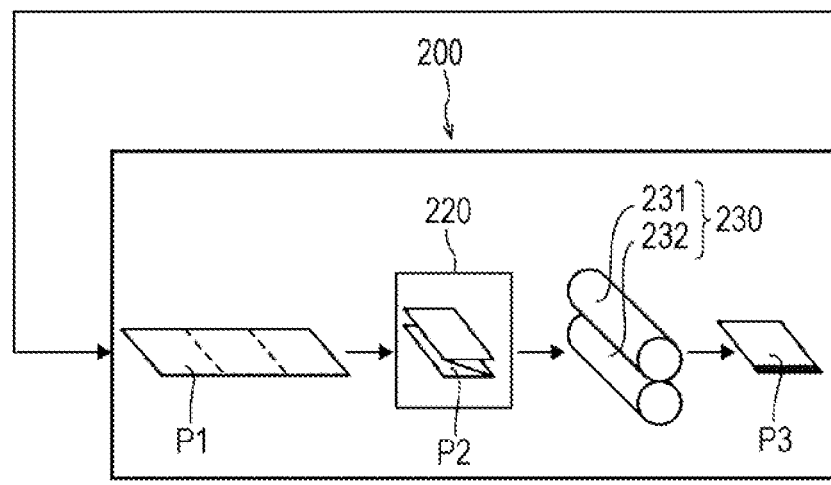

FIG. 3 is a schematic structural view of one example of the printed material producing apparatus according to the exemplary embodiment using an electrophotographic system. The printed material producing apparatus shown in FIG. 3 includes a printing unit 300 and a pressure-bonding unit 200 downstream of the printing unit 300. The printing unit 300 disposes toner on a recording medium and forms color images in one process.

The printing unit 300 is of intermediate transfer type using a five color tandem system. The printing unit 300 includes a unit 10T and units 10Y, 10M, 10C, and 10K. The unit 10T disposes the pressure-responsive particles (T) according to the exemplary embodiment. The units 10Y, 10M, 10C, and 10K respectively form color images of yellow (Y), magenta (M), cyan (C), and black (K). The unit 10T is a disposing unit that disposes the toner on a recording medium P by using a developer containing the toner. The units 10Y, 10M, 10C, and 10K each form a color image on the recording medium P by using a developer containing a color toner. The units 10T, 10Y, 10M, 10C, and 10K each use an electrophotographic system.

The units 10T, 10Y, 10M, 10C, and 10K are arranged and spaced apart from each other in the horizontal direction. The units 10T, 10Y, 10M, 10C, and 10K may be process cartridges that are attachable to and detachable from the printing unit 300.

An intermediate transfer belt (an example of the intermediate transfer body) 20 extends so as to pass through lower parts of the units 10T, 10Y, 10M, 10C, and 10K. The intermediate transfer belt 20 is wound around a drive roll 22, a support roll 23, and an opposing roll 24, which are in contact with the inner surface of the intermediate transfer belt 20. The intermediate transfer belt 20 runs in the direction from the unit 10T toward the unit 10K. An intermediate transfer body cleaning device 21 is disposed adjacent to the image holding surface of the intermediate transfer belt 20 so as to face the drive roll 22.

The units 10T, 10Y, 10M, 10C, and 10K respectively include developing devices (examples of the developing units) 4T, 4Y, 4M, 4C, and 4K. The toner stored in a toner cartridge 8T and yellow toner, magenta toner, cyan toner, and black toner respectively stored in toner cartridges 8Y, 8M, 8C, and 8K are respectively supplied to the developing devices 4T, 4Y, 4M, 4C, and 4K.

Since the units 10T, 10Y, 10M, 10C, and 10K have the same structure and the same operation, the unit 10T which disposes the toner on a recording medium will be described as a representative example.

The unit 10T has a photoreceptor 1T. The photoreceptor 1T is surrounded by, in sequence, a charging roll (an example of the charging unit) 2T, which charges the surface of the photoreceptor 1T, an exposure device (an example of the electrostatic charge image forming unit) 3T, which exposes the charged surface of the photoreceptor 1T to a laser beam to form an electrostatic charge image, a developing device (an example of the developing unit) 4T, which supplies toner to the electrostatic charge image to develop the electrostatic charge image, a first transfer roll (an example of the first transfer unit) 5T, which transfers the developed toner-applied section to an intermediate transfer belt 20, and a photoreceptor cleaning device (an example of the cleaning unit) 6T, which removes the toner remaining on the surface of the photoreceptor 1T after the first transfer. The first transfer roll 5T is disposed on the inner side of the intermediate transfer belt 20 so as to face the photoreceptor 1T.

The operation for disposing the toner on the recording medium P and forming color images will be described below by illustrating the operation of the unit 10T.

First, the charging roll 2T charges the surface of the photoreceptor 1T. The charged surface of the photoreceptor 1T is irradiated with a laser beam from the exposure device 3T in accordance with image data sent from a controller (not shown). An electrostatic charge image having a toner disposition pattern is accordingly formed on the surface of the photoreceptor 1T.

The electrostatic charge image formed on the photoreceptor 1T rotates to a development position as the photoreceptor 1T runs. At the development position, the electrostatic charge image on the photoreceptor 1T is developed by the developing device 4T to form a toner-applied section.

The developing device 4T stores a developer containing at least the toner and a carrier. The toner is triboelectrically charged by stirring the toner together with the carrier inside the developing device 4T and held on a developer roll. As the surface of the photoreceptor 1T passes through the developing device 4T, the toner electrostatically adheres to the electrostatic charge image on the surface of the photoreceptor 1T, whereby the electrostatic charge image is developed with the toner. The photoreceptor 1T having the toner applied-section thereon subsequently runs, and the toner-applied section on the photoreceptor 1T is transported to a first transfer position.

Upon the toner-applied section on the photoreceptor 1T reaching the first transfer position, a first transfer bias is applied to the first transfer roll 5T so that an electrostatic force from the photoreceptor 1T toward the first transfer roll 5T acts on the toner-applied section, transferring the toner-applied section on the photoreceptor 1T to the intermediate transfer belt 20. The toner remaining on the photoreceptor 1T is removed and collected by the photoreceptor cleaning device 6T. The photoreceptor cleaning device 6T is, for example, a cleaning blade or a cleaning brush, preferably a cleaning brush.

The units 10Y, 10M, 10C, and 10K also operate in the same manner as the unit 10T by using developers containing color toner. Accordingly, the intermediate transfer belt 20 to which the toner-applied section has been transferred in the unit 10T passes through the units 10Y, 10M, 10C, and 10K in this order, and the toner images of respective colors are transferred to the intermediate transfer belt 20 in a superimposed manner.

The intermediate transfer belt 20 to which the toner-applied section and the toner images have been transferred through the units 10T, 10Y, 10M, 10C, and 10K in a superimposed manner reaches a second transfer section. The second transfer section includes the intermediate transfer belt 20, the opposing roll 24 in contact with the inner surface of the intermediate transfer belt, and a second transfer roll (an example of the second transfer unit) 26 disposed adjacent to the image holding surface of the intermediate transfer belt 20. The recording medium P is fed to a nip between the second transfer roll 26 and the intermediate transfer belt 20 by way of a feeding mechanism, and a second transfer bias is applied to the opposing roll 24. At this time, an electrostatic force from the intermediate transfer belt 20 toward the recording medium P acts on the toner-applied section and the toner images, transferring the toner-applied section and the toner images on the intermediate transfer belt 20 to the recording medium P.

The recording medium P to which the toner-applied section and the toner images have been transferred is transported to a thermal fixing device (an example of the thermal fixing unit) 28. The thermal fixing device 28 includes a heat source, such as a halogen heater, and heats the recording medium P. The surface temperature of the recording medium P heated by the thermal fixing device 28 is preferably 150° C. or higher and 220° C. or lower, more preferably 155° C. or higher and 210° C. or lower, still more preferably 160° C. or higher and 200° C. or lower. As the recording medium P passes through the thermal fixing device 28, the color toner images are thermally fixed to the recording medium P.

The thermal fixing device 28 may be a device that applies pressure under heating in order to prevent the toner from falling off the recording medium P and improve the fixability of the color image to the recording medium P. The thermal fixing device 28 may be, for example, a pair of fixing members (roll/roll, belt/roll) having a heat source inside.

When the thermal fixing device 28 applies pressure, the pressure applied to the recording medium P by the thermal fixing device 28 may be lower than the pressure applied to a recording medium P2 by a pressure device 230. Specifically, the pressure may be 0.2 MPa or more and 1 MPa or less.

As the recording medium P passes through the printing unit 300, the recording medium P becomes a recording medium P1 having the color image and the toner thereon. The recording medium P1 is transported toward the pressure-bonding unit 200.

The pressure-bonding unit 200 in FIG. 3 may have the same structure as the pressure-bonding unit 200 in FIG. 2, and the structure and operation of the pressure-bonding unit 200 in FIG. 3 are not described in detail.

In the printed material producing apparatus according to the exemplary embodiment, the printing unit 300 and the pressure-bonding unit 200 may be adjacent to each other or may be distant from each other. When the printing unit 300 and the pressure-bonding unit 200 are distant from each other, the printing unit 300 is connected to the pressure-bonding unit 200 through, for example, a transporting unit (e.g., a belt conveyor) that transports the recording medium P1.

The printed material producing apparatus according to the exemplary embodiment may include a cutting unit that cuts a recording medium into a predetermined size. Examples of the cutting unit include a cutting unit that is disposed between the printing unit 300 and the pressure-bonding unit 200 and cuts away a region that is part of the recording medium P1 and that does not have the toner thereon; a cutting unit that is disposed between the folding device 220 and the pressure device 230 and cuts away a region that is part of the recording medium P2 and that does not have the toner thereon; and a cutting unit that is disposed downstream of the pressure-bonding unit 200 and cuts away a region that is part of the pressure-bonded printed material P3 and that is not bonded with the toner.

The printed material producing apparatus according to the exemplary embodiment is not limited to a sheet-fed apparatus. The printed material producing apparatus according to the exemplary embodiment may be an apparatus that forms a long pressure-bonded printed material by subjecting a long recording medium to the color image forming step, the disposing step, and the pressure-bonding step, and then cuts the long pressure-bonded printed material into a predetermined size.

Process Cartridge

A process cartridge to be installed in a printed material producing apparatus using an electrophotographic system will be described.

A process cartridge according to an exemplary embodiment includes a developing unit that stores the electrostatic charge image developer according to the exemplary embodiment and that develops an electrostatic charge image on the surface of a photoreceptor by using the electrostatic charge image developer to form a toner-applied section. The process cartridge is attachable to and detachable from a printed material producing apparatus.

The process cartridge according to the exemplary embodiment may include a developing unit, and as necessary, at least one selected from a photoreceptor, a charging unit, an electrostatic charge image forming unit, a transfer unit, and the like.

Exemplary embodiments of the process cartridge include a cartridge including a photoreceptor and, on the periphery of the photoreceptor, a charging roll (an example of the charging unit), a developing device (an example of the developing unit), and a photoreceptor cleaning device (an example of the cleaning unit), which are integrated by a housing. The housing has an opening for exposure. The housing has an installation rail, and the process cartridge is attached to the printed material producing apparatus through the installation rail.

The image forming apparatus shown in FIG. 1 includes detachable toner cartridges 8Y, 8M, 8C, and 8K. The developing devices 4Y, 4M, 4C, and 4K are connected to the respective toner cartridges corresponding to the developing devices (colors) through toner feed tubes (not shown). When the toner stored in each toner cartridge runs short, the toner cartridge is replaced.

EXAMPLES

The exemplary embodiments will be described below in more detail by way of Examples and Comparative Examples, but the exemplary embodiments are not limited to these Examples. The units "part" and "%" indicating the amount are on a mass basis, unless otherwise specified.

Example 1

Preparation of Styrene-Based Resin Particle Dispersion St1
Styrene (St): 370 parts
n-Butyl acrylate (BA): 115 parts
Acrylic acid (AA): 15 parts
Dodecanethiol: 7.5 parts The above materials are mixed and dissolved to prepare a monomer solution.

An anionic surfactant (DOWFAX 2A1 available from The Dow Chemical Company) (8 parts) is dissolved in 205 parts of ion exchange water, and the monomer solution is added to the resulting solution and dispersed to form an emulsion.

The anionic surfactant (2.2 parts) is dissolved in 462 parts of ion exchange water, and the resulting solution is placed in a flask for polymerization equipped with a stirrer, a thermometer, a reflux condenser, and a nitrogen gas inlet tube. The solution is heated to 73° C. under stirring and held at this temperature.

Ammonium persulfate (3 parts) is dissolved in 21 parts of ion exchange water, and the resulting solution is added dropwise to the flask for polymerization through a metering pump over 15 minutes, and the emulsion is then added dropwise over 160 minutes through a metering pump.

Next, the flask for polymerization is held at 75° C. for three hours under gentle stirring, and then returned to room temperature (25° C., the same applies hereinafter).

This process produces a styrene-based resin particle dispersion St1 having a volume average particle size (D50v) of 175 nm, a weight average molecular weight of 45,000 as determined by GPC (UV detection), a glass transition temperature of 53° C., and a solid content of 42%.
Preparation of Composite Resin Particle Dispersion SMS1
Styrene-based resin particle dispersion St1: 500 parts (solid content)
n-Butyl acrylate (BA): 250 parts
2-Ethylhexyl acrylate (2EHA): 150 parts
Ion exchange water: 982 parts The above materials are placed in a flask for polymerization, stirred at 25° C. for one hour, and then heated to 70° C. Ammonium persulfate (2.5 parts) is dissolved in 75 parts of ion exchange water, and the resulting solution is added dropwise to the flask for polymerization through a metering pump over 60 minutes. Next, the flask for polymerization is held at 70° C. for three hours under gentle stirring.

A monomer solution formed by mixing and dissolving 85 parts of styrene and 15 parts of n-butyl acrylate is added dropwise over 30 minutes, held for three hours, and then returned to room temperature.

This process produces a composite resin particle dispersion SMS1 (pressure-sensitive adhesive) that has a solid content of 32% and in which the composite resin particles have a volume average particle size (D50v) of 220 nm, and the resin of the composite resin particles has a weight average molecular weight of 210,000 as determined by GPC (UV detection).

Comparative Example 1

The composite resin particle dispersion (pressure-sensitive adhesive) is produced in the same manner as in Example 1 except that a monomer solution formed by mixing and dissolving 85 parts of styrene and 15 parts of n-butyl acrylate is not added dropwise.

Examples 2 to 18 and Comparative Examples 2 and 3

Composite resin particle dispersions (pressure-sensitive adhesives) are produced in the same manner as in Example 1 except that the ratio of material monomers used in the polymerization step A, the polymerization step B, and the polymerization step C is changed as described in Table 1 without changing the total amount of the resins.

Evaluation of Tackiness

A text image is printed with an electrophotographic printer. To a sheet of paper obtained by cutting paper into a V-folded postcard size, the produced pressure-sensitive adhesive is applied at 8 g/m$^2$ by using a bar coater and dried. The sheet of paper is then folded in two, pressed (Gap 25) through a sealer (Pressle multi2 available from Toppan Forms Co., Ltd.), left to stand overnight, and then cut into a width of 15 mm, which is then subjected to a 90-degree peel test to measure the peel force (unit: N/15 mm) and evaluate tackiness.

The evaluation criteria are described below.
A: ≥0.8 N/15 mm
B: more than 0.4 N/15 mm and less than 0.8 N/15 mm
C: ≤0.4 N/15 mm Grade A or B is preferred, and Grade A is more preferred.
Evaluation of Dispersion Storage Stability The produced composite particle dispersion is stored in a sealed chamber at 30° C. for one month, and the particle size distribution is then measured by Coulter LS. If aggregated particles are formed, the measured volume average particle size distribution has two peaks with one peak on the coarse particle side. The evaluation criteria are described below.

A: The volume average particle size distribution has one peak, which is the same particle size distribution as the initial one.

B: The volume average particle size distribution has two peaks with one peak on the coarse particle side and returns to one peak after re-stirring.

C: The volume average particle size distribution has two peaks with one peak on the coarse particle side and does not return to one peak even after re-stirring.

Grade A or B is preferred, and Grade A is more preferred.

Evaluation of Capability of Preventing Sheet Tearing after Storage

A sheet that has been pressed with a sealer in the same manner as in the evaluation of tackiness is stored in a chamber at 30° C. and 90% RH for one week, and the bonded section is peeled by hand and evaluated for the presence of sheet tearing according to the following evaluation criteria.

A: No tearing
B: Slight sheet tearing (no problem with the image)
C: Large sheet tearing (tearing reaches the image)

Grade A or B is preferred, and Grade A is more preferred.

The evaluation results are summarized in Table 1.

TABLE 1

|  | Styrene-Based Resin Synthesized in Polymerization Step A | | | (Meth)Acrylic Acid Ester-Based Resin Synthesized in Polymerization Step B | | Styrene-Based Resin Synthesized in Polymerization Step C | |
|---|---|---|---|---|---|---|---|
|  | Resin Particle Dispersion | Mass Ratio of Polymer Components | Tg (° C.) | Mass Ratio of Polymer Components | Tg (° C.) | Mass Ratio of Polymer Components | Tg (° C.) |
| Example 1 | St1 | St/BA/AA = 74/23/3 | 53 | 2EHA/BA = 38/62 | −50 | St/BA = 85/15 | 53 |
| Example 2 | St1 | St/BA/AA = 74/23/3 | 53 | 2EHA/BA = 38/62 | −50 | St/BA = 85/15 | 53 |
| Example 3 | St1 | St/BA/AA = 74/23/3 | 53 | 2EHA/BA = 38/62 | −50 | St/BA = 85/15 | 53 |
| Example 4 | St1 | St/BA/AA = 74/23/3 | 53 | 2EHA/PA = 38/62 | −40 | St/BA = 85/15 | 53 |
| Example 5 | St1 | St/BA/AA = 74/23/3 | 53 | 2EHA/HA = 38/62 | −50 | St/BA = 85/15 | 53 |
| Example 6 | St1 | St/BA/AA = 74/23/3 | 53 | 2EHA/EA = 38/62 | −30 | St/BA = 85/15 | 53 |
| Example 7 | St1 | St/BA/AA = 74/23/3 | 53 | 2EHA/4HBA = 38/62 | −50 | St/BA = 85/15 | 53 |
| Example 8 | St1 | St/BA/AA = 74/23/3 | 53 | 2EHA/BA = 50/50 | −50 | St/BA = 85/15 | 53 |
| Example 9 | St1 | St/BA/AA = 74/23/3 | 53 | 2EHA/EA = 50/50 | −40 | St/BA = 85/15 | 53 |
| Example 10 | St2 | St/BA/MAA = 74/23/3 | 53 | 2EHA/BA = 38/62 | −50 | St/BA = 85/15 | 53 |
| Example 11 | St3 | St/2EHA/AA = 74/23/3 | 53 | 2EHA/BA = 38/62 | −50 | St/BA = 85/15 | 53 |
| Example 12 | St4 | St/EA/AA = 63/35/2 | 54 | 2EHA/BA = 38/62 | −50 | St/BA = 85/15 | 53 |
| Example 13 | St5 | St/EA/AA = 74/23/3 | 70 | 2EHA/BA = 38/62 | −50 | St/BA = 85/15 | 53 |
| Example 14 | St5 | St/EA/AA = 74/23/3 | 70 | 2EHA/BA = 38/62 | −50 | St/BA = 85/15 | 53 |
| Example 15 | St1 | St/BA/AA = 74/23/3 | 53 | 2EHA/BA = 38/62 | −50 | St/2EHA = 85/15 | 53 |
| Example 16 | St1 | St/BA/AA = 74/23/3 | 53 | 2EHA/BA = 38/62 | −50 | St/EA = 85/15 | 80 |
| Example 17 | St1 | St/BA/AA = 74/23/3 | 53 | 2EHA/BA = 38/62 | −50 | St/BA = 90/10 | 65 |
| Example 18 | St1 | St/BA/AA = 74/23/3 | 53 | 2EHA/BA = 38/62 | −50 | St/BA = 65/35 | 40 |
| Comparative Example 1 | St1 | St/BA/AA = 74/23/3 | 53 | 2EHA/BA = 38/62 | −50 | — | 53 |
| Comparative Example 2 | St1 | St/BA/AA = 74/23/3 | 53 | 2EHA/BA = 38/62 | −50 | St/BA = 85/15 | 53 |
| Comparative Example 3 | St1 | St/BA/AA = 74/23/3 | 53 | 2EHA/BA = 38/62 | −50 | St/BA = 85/15 | 53 |

|  | Composite Resin Particles | | | | |
|---|---|---|---|---|---|
|  | Mass Ratio of Monomers Used in Polymerization Step A/Polymerization Step B/Polymerization Step C | Mass Ratio of St-Based Resin/Ac-Based Resin | Tackiness | Dispersion Storage Stability | Capability of Preventing Sheet Tearing After Storage |
| Example 1 | 50/40/10 | 60/40 | A | A | A |
| Example 2 | 67/23/10 | 77/23 | B | A | A |
| Example 3 | 17/78/5 | 22/78 | B | A | B |
| Example 4 | 50/40/10 | 60/40 | A | A | A |
| Example 5 | 50/40/10 | 60/40 | A | A | A |
| Example 6 | 50/40/10 | 60/40 | B | A | A |
| Example 7 | 17/78/5 | 22/78 | B | B | B |
| Example 8 | 50/40/10 | 60/40 | A | A | A |
| Example 9 | 50/40/10 | 60/40 | A | A | A |
| Example 10 | 50/40/10 | 60/40 | A | A | A |
| Example 11 | 17/78/5 | 22/78 | B | A | B |
| Example 12 | 17/78/5 | 22/78 | B | A | B |
| Example 13 | 17/78/5 | 22/78 | A | A | B |
| Example 14 | 17/78/5 | 77/23 | B | A | A |
| Example 15 | 50/40/10 | 60/40 | A | A | A |
| Example 16 | 50/40/10 | 60/40 | B | A | A |
| Example 17 | 50/40/10 | 60/40 | A | A | A |
| Example 18 | 67/23/10 | 77/23 | A | B | A |
| Comparative Example 1 | 60/40/0 | 60/40 | A | A | C |
| Comparative Example 2 | 73/17/10 | 83/17 | C | A | A |
| Comparative Example 3 | 10/85/5 | 15/85 | A | C | C |

In Table 1, the "Ac-based resin" indicates a (meth)acrylic acid ester-based resin, and the "St-based resin" indicates a styrene-based resin.

In Table 1, the monomers are denoted by the following abbreviations.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, hexyl acrylate: HA, propyl acrylate: PA The above results indicate that Examples show better tackiness and better storage stability in the form of dispersion and prevent sheet tearing after storage compared with Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a composite resin particle dispersion, the method comprising:
    performing polymerization A by polymerizing a styrene compound and a vinyl monomer other than the styrene compound to form a styrene-based resin;
    performing polymerization B by polymerizing a (meth)acrylic acid ester compound in the presence of the styrene-based resin to form intermediate resin particles containing the styrene-based resin and a (meth)acrylic acid ester-based resin; and
    performing polymerization C by polymerizing a styrene compound and a vinyl monomer other than the styrene compound in the presence of the intermediate resin particles to form composite resin particles,
    wherein a mass ratio in the composite resin particles of a total mass of the styrene-based resin obtained in the polymerization steps A and C to a mass of the (meth)acrylic acid ester-based resin obtained in the polymerization step B is from 80:20 to 20:80,
    a difference between the lowest glass transition temperature of the (meth)acrylic acid ester-based resin contained in the composite resin particles and the highest glass transition temperature of the styrene-based resin contained in the composite resin particles in the composite resin particles is 30° C. or more,
    the styrene-based resin synthesized in the polymerization step C and the (meth)acrylic acid ester-based resin synthesized in the polymerization step B each have a structural unit derived from the same (meth)acrylic acid ester compound,
    the styrene-based resin synthesized in the polymerization step A contain at least one of n-butyl acrylate or 2-ethylhexyl acrylate as a polymer component, and a total amount of the n-butyl acrylate and the 2-ethylhexyl acrylate relative to a total amount of the polymer components of the styrene-based resin synthesized in the polymerization step A is 30 mass % to 10 mass %, and
    the styrene-based resin synthesized in the polymerization step A, the (meth)acrylic acid ester-based resin synthesized in the polymerization step B, and the styrene-based resin synthesized in the polymerization step C have a structural unit derived from the same (meth) acrylic acid ester compound.

2. The method for producing a composite resin particle dispersion according to claim 1, wherein a mass ratio of a total amount of the styrene compound and the vinyl monomer other than the styrene compound added in the polymerization C to an amount of the (meth)acrylic acid ester-based resin contained in the intermediate resin particles is from 5:95 to 40:60.

3. The method for producing a composite resin particle dispersion according to claim 1, wherein the styrene compounds used in the polymerization A and the polymerization C are styrene.

4. The method for producing a composite resin particle dispersion according to claim 3, wherein a mass percentage of the styrene relative to a total mass of polymer components of the styrene-based resin in the composite resin particles is 60 mass % or more and 95 mass % or less.

5. The method for producing a composite resin particle dispersion according to claim 1, wherein the vinyl monomer used in the polymerization A and the vinyl monomer used in the polymerization C include a (meth)acrylic acid ester compound.

6. The method for producing a composite resin particle dispersion according to claim 1, wherein the (meth)acrylic acid ester compound used in the polymerization B includes at least two (meth)acrylic acid ester compounds.

7. The method for producing a composite resin particle dispersion according to claim 6, wherein the (meth)acrylic acid ester compound used in the polymerization B includes 2-ethylhexyl acrylate and n-butyl acrylate.

8. The method for producing a composite resin particle dispersion according to claim 1, wherein a mass percentage of the (meth)acrylic acid ester compound relative to a total mass of polymer components of the (meth)acrylic acid ester-based resin contained in the composite resin particles is 90 mass % or more.

9. The method for producing a composite resin particle dispersion according to claim 1, wherein the (meth)acrylic acid ester-based resin contained in the composite resin particles has a glass transition temperature of −30° C. or lower.

10. The method for producing a composite resin particle dispersion according to claim 1, wherein the styrene-based resin contained in the composite resin particles has a glass transition temperature of 30° C. or higher.

11. The method for producing a composite resin particle dispersion according to claim 7, wherein a total amount of the n-butyl acrylate and the 2-ethylhexyl acrylate relative to a total amount of the polymer components of the (meth) acrylic acid ester-based resin is 90 mass % or more.

12. The method for producing a composite resin particle dispersion according to claim 1, wherein a mass ratio of a total amount of the styrene compound and the vinyl monomer other than the styrene compound added in the polymerization C to an amount of the (meth)acrylic acid ester-based resin contained in the intermediate resin particles is from 5:95 to 40:60,
    the styrene compounds used in the polymerization A and the polymerization C are styrene, and
    a mass percentage of the styrene relative to a total mass of polymer components of the styrene-based resin in the composite resin particles is 60 mass % or more and 95 mass % or less.

* * * * *